(12) United States Patent
Kim et al.

(10) Patent No.: US 10,965,232 B2
(45) Date of Patent: Mar. 30, 2021

(54) ADVANCED CROSS CURRENT COMPENSATION SYSTEM AND METHOD FOR ENHANCING REACTIVE CURRENT SHARING IN POWER GENERATION HAVING MULTIPLE GENERATORS

(71) Applicant: BASLER ELECTRIC COMPANY, Highland, IL (US)

(72) Inventors: Kiyong Kim, Collinsville, IL (US); Daniel Weber, Manchester, MO (US)

(73) Assignee: Basler Electric Company, Highland, IL (US)

( * ) Notice: Subject to any disclaimer, the term of this patent is extended or adjusted under 35 U.S.C. 154(b) by 0 days.

(21) Appl. No.: 16/962,420

(22) PCT Filed: Feb. 21, 2020

(86) PCT No.: PCT/US2020/019299
§ 371 (c)(1),
(2) Date: Jul. 15, 2020

(87) PCT Pub. No.: WO2020/172578
PCT Pub. Date: Aug. 27, 2020

(65) Prior Publication Data
US 2020/0403542 A1 Dec. 24, 2020

Related U.S. Application Data

(60) Provisional application No. 62/809,009, filed on Feb. 22, 2019.

(51) Int. Cl.
*H02P 9/14* (2006.01)
*H02J 3/18* (2006.01)
*H02P 9/02* (2006.01)

(52) U.S. Cl.
CPC .................. *H02P 9/14* (2013.01); *H02J 3/18* (2013.01); *H02P 9/02* (2013.01)

(58) Field of Classification Search
CPC .................. H02P 9/01; H02P 9/14; H02J 3/18
See application file for complete search history.

(56) References Cited

U.S. PATENT DOCUMENTS

| | | |
|---|---|---|
| 5,754,033 A | 5/1998 | Thomson |
| 6,218,813 B1 | 4/2001 | Davis |
| 6,285,168 B1 | 9/2001 | Davis |
| 6,501,628 B1 | 12/2002 | Namba et al. |
| 7,019,495 B2 | 3/2006 | Patterson |

(Continued)

OTHER PUBLICATIONS

International Search Report for PCT/US2020/19299 dated May 28, 2020.
Written Opinion for PCT/US2020/19299 dated May 28, 2020.

*Primary Examiner* — Sean Gugger
(74) *Attorney, Agent, or Firm* — Sandberg Phoenix & von Gontard P.C.

(57) ABSTRACT

The present system and method provides a cross-current compensation control system that provides for improved load sharing performance during the parallel operation of multiple generators through use of a Proportional Integral PI controller or a Proportional Integral Differential PID controller eliminating steady state error in reactive current sharing, with such providing a stable and robust response with uncertain variations of equipment in the power system through improved cross-current compensation when various system parameter uncertainties exist.

31 Claims, 11 Drawing Sheets

(56) References Cited

U.S. PATENT DOCUMENTS

| | | | |
|---|---|---|---|
| 7,053,503 | B2 | 5/2006 | Tange et al. |
| 7,319,307 | B2 | 1/2008 | Wiegman et al. |
| 8,129,863 | B2 | 3/2012 | Eguchi et al. |
| 2003/0111907 | A1 | 6/2003 | Tange et al. |
| 2018/0328342 | A1 | 11/2018 | Ren et al. |

ADVANCED CROSS CURRENT COMPENSATION SYSTEM AND METHOD FOR ENHANCING REACTIVE CURRENT SHARING IN POWER GENERATION HAVING MULTIPLE GENERATORS

CROSS-REFERENCE TO RELATED APPLICATIONS

This application is a National Stage of International Application No. PCT/US2020/019299, filed Feb. 21, 2020, and claims the benefit of U.S. Provisional Patent Application No. 62/809,009, filed on Feb. 22, 2019, the disclosures of which are incorporated herein by reference in their entirety.

FIELD

The present disclosure relates to power generation systems and, more specifically, to a control system for power generation systems having multiple generators.

BACKGROUND

The statements in this section merely provide background information related to the present disclosure and may not constitute prior art.

Multiple generators or generator sets (gensets) are often operated in parallel to improve fuel economy and the reliability power generation of a power supply. Fuel economy is improved with multiple paralleled generators by selecting only sufficient generators to carry the load demand at any given time. By operating each generator near its full capacity, fuel is utilized efficiently. Each of the multiple generators provides an output power to a connected generator transformer that then connects the generator output to the power grid or load. Each generator's transformer transforms the received power to the desired or specified grid or transmission line power.

An automatic voltage regulator (AVR) is an electronic device used to provide precise, regulated generator voltage when a generator is at no load and when changing loads on the generator. In many implementations, an AVR is used to control the reactive operations of the generator by providing and adjusting the generator field power such as the excitation power. Since the AVR controls only the reactive power, this disclosure only addresses the control of the reactive power even though the generators produce both real and reactive power. As such, and for simplifying this disclosure, real power is assumed to be zero unless otherwise stated. In many implementations, an AVR is used to control the operations of the generator by providing the generator field power such as excitation voltage to an exciter or other generator component for controlling the reactive power output of the generator power. The generator field power, such as excitation voltage, is often a DC voltage and is provided to the generator field power or excitation input of the generator, for powering the generator field so that generator produces an output terminal voltage $V_T$ that has a fixed or stable reactive current regardless of the real power being drawn by the grid load at any particular time during operation. When generators are connected together in parallel operation, a parallel compensation element is required to assist each generator's AVR in controlling the generator's reactive loads as addressed in IEEE Std. 421.5-2016, IEEE Recommended Practice for Excitation System Models for Power System Stability Studies.

As noted, each generator includes a generator field input for receiving a generator field input voltage or power that is typically provided by the AVR. Typically, the generator field input voltage is an amount that is a predetermined reference generator field voltage amount, which is also commonly referred to as the voltage set point, such as by way of example can be 12 volts DC. The AVR can receive a base generator field power such as 12 volts DC from a local DC power source, from which the AVR derives the determined reference generator field voltage. Alternatively, the AVR can obtain or derive a desired or determined generator power from an input power such as obtained from an output of one or more of the generators or locally. Regardless of how the reference generator field voltage is obtained by the AVR, the AVR's generated generator field voltage (or power) is provided to the generator field or excitation field of the generator, which controls the input to the main field of the generator and that results in the generation of the generated output power or terminal voltage $V_T$ of the generator.

Generally, a basic AVR senses the output terminal voltage $V_T$ of a generator and compares it to a reference voltage $V_{REF}$. Based on such comparison of these two voltages, the AVR produces the generator field input voltage that is an adjusted generator field value. The value is adjusted up or down from the predetermined generator field input voltage that results in a change of control of the generator and therefore a change in the output terminal voltage $V_T$. Two or more generators operating in parallel to supply a common load operate in a similar manner, each with their own associated AVR and predetermined reference generator field voltage. If the terminal voltage $V_T$ in an open-circuit mode of operation is exactly the same on all generators, the generators divide the load equally between themselves. Any small difference between terminal voltages $V_T$ at the outputs of two or more generators results in unbalanced load division or, in the extreme situation, the creation of an undesirable circulating current.

In practice, the precise matching of output terminal voltages $V_T$ of two or more generators is not possible, and as such some amount of circulating current or load unbalance results from the voltage mismatch. To address these issues, two forms of multiple generator control have been developed to address mismatches in the output terminal voltages $V_T$ of multiple generators, both of which are referred to as parallel compensation methods as addressed in Rubenstein, A. S., and W. W. Wakley, "Control of reactive kVA with modern amplidyne voltage." The most commonly used type of paralleling compensation is parallel droop compensation, which is also referred to as reactive droop compensation, or simply "Droop compensation." The other type of parallel compensation is cross-current compensation (hereinafter "CCC"), which is also referred to as reactive differential compensation.

Droop compensation is utilized to "droop" the voltage profile with increasing reactive power output of the generator. When two generators are operated in parallel, utilizing their droop curves, the reference generator field voltage (or voltage set points) as provided by their respective AVRs are adjusted to generator field values to provide for proportionally sharing of the reactive load. A droop compensation control circuit and method reacts to any imbalance in the terminal voltages produced by the generators. Such generator field controls the droop compensation to change the generator field input values of their respective AVRs in a direction to bring the load back into balance between the multiple generators. When droop compensation is used as an input to each AVR of two or more parallel generators, each parallel droop compensation circuit or element as provided to each generator's AVR is independent of the others, and each magnitude of the change of the adjusted generator field value from the predetermined reference generator field voltage for each generator depends upon the magnitude of the load and power factor.

In the second parallel compensation method, in order to prevent the terminal voltage $V_T$ from increasing or decreasing as a function of a change in the power factor of the load, a cross-current compensation CCC element is used as an input to the AVR for controlling the determination of the adjusted generator field value as provided to the generator field input of the generator and therefore operation of the generator. CCC is a method that allows two or more paralleled generators to share a reactive load. A representation of the reactive current $I_d$ of each generator is established by the secondary wiring of the compounding current transformers ("CCT" or "CTs) of all the generators that are in parallel. A typical conventional CCC control wiring configuration for two generators is shown in FIG. 1. The difference between the reactive currents of these two illustrated generators is estimated from this configuration. As shown, the prior art system CCC control system 100 includes a power generation circuit 102 that has two or more generators 104, forming a generator set or genset 104, which in this example reflects two generators GEN A 104A and GEN B 104B. Each has a generator field 118, (118A, 118B), and a generator field input 106, (106A, 106B), for receiving the generator field voltage or power $E_F$ from an AVR 124, shown as 124A, 124B, via output 125, shown as 125A, 125B, respectively. The generator field 118 receives the generator field input 106 for varying an operation of the generator 104 that varies the reactive output power and terminal voltage $V_T$ generated by the generator 104. Each generator, GEN A 104A and GEN B 104B, has a power generation output 112, (112A. 112B) that provides generator output power. Such output power includes reactive power, which includes a terminal voltage $V_T$, shown as $V_{TA}$, $V_{TB}$, and reactive current $I_{dA}$, $i_{dB}$, both respectively.

The generated reactive power of each generator 104A, 104B as represented as $i_{dA}$ and $i_{dB}$, respectively, as well at terminal voltages $V_{TA}$, $V_{TB}$ are provided to a compounding transformer CT 114, shown as 114A, 114B, respectively. After CT 114, generated power is then provided to the system output 108, which provides the generated power Q to the grid load 110. As addressed above, each generator 104A, 104B is controlled by its generator field or excitation system 122A, 122B with CCC loop A based on the received generator field power $E_{FA}$ and $E_{FB}$ for controlling each associated generator 104A, 104B, respectively.

The conventional CCC control system 120 of FIG. 1 provides the generator field voltage $E_{FA}$ and $E_{FB}$ to the generator field inputs 106A, 106B for powering the operational control of the generator fields 118A, 118B. The generator field control system 120 as shown by way of example in FIG. 1 typically includes a CCC element 122, shown as 122A, 122B, each of which includes an AVR 124, such as AVR 124A and AVR 124B, respectively, as well as reference voltages $V_{REFA}$ and $V_{REFB}$ as provided by reference voltage sources 126A, 126B, respectively.

Equal current develops through the CTs 114A, 114B of the circuit 102 in parallel when the multiple generators 104 in the power generation circuit 102 are identical. It should be noted that when referring to the CT's, the common control is with reference to the secondary current in the secondary wirings of the CTs, which is the reference as described herein unless otherwise stated. When the generators 104, such as 104A and 104B, are not of equal size, the level of the cross-current to be controlled by each AVR 124A, 124B must be adjusted individually based on the rating of each generator 104A, 104B. Generally, the CTs are selected to provide the same secondary current in each CT.

Each AVR 124 receives a reactive current input CCCT+ from the input side of the associated CT 114 and output CCCT− from the output side of the compounding transformer CT 114 as shown in FIG. 1. The conventional cross-current compensation CCC, also referred to in the art as reactive differential, is provided so that the two or more generators 104A, 104B that are in parallel can equally share the reactive load 110. The secondary wirings of all CTs 114 for each parallel generator 104 are connected. The current flow $I_R$ will be the difference of the current that commonly flows through both CT's 114A and 114B.

Each AVR 124A, 124B produces a reference generator field voltage for each generator's generator fields 118 that is a function of the generator's produced reactive power Q. This reference generator field voltage for a generator 104 is used to regulate the generator field voltage $E_F$ that is provided to generator field control input 106 to each generator field 118 of each generator 104. Ideally, the reference generator field voltage produced by an AVR 124 is selected (or predetermined) so that the reactive power difference of the generators 104A and 104B is zero.

Each of the resistors shown in FIG. 1 is used to set the burden and may be determined or adjusted to suit the application or implementation.

SUMMARY OF DISCLOSURE

In implementations of multiple parallel generators, to achieve proper reactive current sharing, a considerable amount of field testing is required to determine the necessary exact gains. This field testing is time consuming, costly and often not accurate over time.

In order to reduce the presently required field tests that are required to determine necessary exact gains to achieve proper reactive current sharing, an improved CCC control system and method is disclosed herein. The present disclosure discloses an improved CCC control system that reduces the previously discussed problems of unbalanced reactive current sharing that can occur due to small differences in voltage generated by multiple generators. Unlike prior art systems that require extensive offline testing prior to attachment to a load, the presently disclosed system and method utilizes a proportional integral PI controller, or in the some embodiments, a proportional, integral, differential PID controller, both of which are referred herein as a PIC unless otherwise specifically stated, that has as an input the difference between the reactive current of one of a plurality of the generators to be controlled, referred to herein as the "controlled generator" $I_{Rtar}$, (shown in the formulas that will be addressed as "$I_R$") and an average reactive current of all paralleled generators $I_{Ravg}$ (as shown in the formulas that will be discussed as "$I_R$"). With the improved CCC control system for the new CCC element, steady state errors are eliminated by the PIC and an improved stable and robust controlled output power response is obtained. In the present disclosed control system and method, when reactive current difference as determined by the PIC is equal to or about zero, the control systems reacts as the conventional previously described prior art CCC system. However, when a difference between the reactive current IR of one of the plurality of generators (referred to as a controlled generator referred to as the $I_{Rtar}$) and the average reactive current $I_{Ravg}$ occurs and the integral gain is not zero, the present PIC provides a new input characteristic to the CCC element for controlling one or more of the generators until a steady state position is achieved, i.e., steady state is where no difference continues to exist.

According to one aspect of the present disclosure, a method of controlling a power generation system has two or more generators connected in parallel operation. Each of the generators has a terminal voltage and supplies a generator reactive power output to a common load. Each generator also has a generator control input coupled to an automatic voltage regulator (AVR) with a generator reference voltage. The power generation system also has a parallel cross-current compensation CCC element coupled to the output of each generator for receiving both reactive current from the generator. The CCC element is also coupled to the AVR to provide a reactive current compensation to the AVR. The method of controlling includes the process of receiving a reactive current of a controlled generator that is one of two or more generators that is to be controlled, receiving a first generator reactive current from a first generator, and receiving a second generator reactive current from a second generator. The method provides for determining an average generator reactive current by averaging the received first and second generator reactive currents and determining a difference reactive current that is a difference between the received reactive current and the determined average generator reactive current. The method also includes providing the determined difference reactive current to an input of a proportional-integral PI controller PIC and generating an adjusted reactive current compensation as a function of the determined difference reactive current.

According to another aspect, a system is configured for controlling a power generation system having two or more generators connected in parallel operation with each generator having a terminal voltage and supplying a generator reactive power output to a common load. Each generator also has a control input coupled to an automatic voltage regulator ("AVR") with a generator reference voltage. The power generation system also has a parallel CCC element coupled to the output of each generator for receiving reactive current therefrom. The CCC element is configured to provide a reactive current compensation to the AVR. The control system includes a proportional-integral PI controller PIC, a memory storing executable instructions and a processor configured for executing the stored executable instructions. The control system has an input for receiving a reactive current of a controlled generator that is one generator that is selected to be controlled from among the two or more generators, a first generator reactive current from a first generator, and a second generator reactive current from a second generator. The processor is coupled to the memory and is configured for executing the stored executable instructions that include the operations of determining an average generator reactive current by averaging the received first and second generator reactive currents. The operations also include determining a difference reactive current that is a difference between the received reactive current and the determined average generator reactive current. The method also includes providing the determined difference reactive current to an input of the PIC that is configured to receive the determined difference reactive current, and determining an adjusted reactive current compensation that is then provided to the control input of the generator.

Another disclosed aspect is a method of controlling a power generation system which has two or more generators that are connected in parallel operation and with each generator having a terminal voltage and that supply a generator reactive power output to a common load. Each generator has a control input coupled to an AVR with a generator reference voltage. The power generator system also includes a parallel CCC element coupled to the output of each generator for receiving reactive current and coupled to the AVR for providing a reactive current compensation to the AVR. The method of controlling power generation by the two or more generators includes the operations performed by an improved control system and method that has a PIC therein. The control system also has a memory storing executable instructions, an input, an output coupled to the parallel compensation element, and a processor coupled to the memory and operable for executing the stored executable instructions. The control system is configured to perform the operations of receiving at the input a reactive current of a controlled generator, that is one of the two or more generators to be controlled, receiving at the input a first generator reactive current from a first generator, and receiving a second generator reactive current from a second generator. The control system is also configured for performing the operations of determining an average generator reactive current by averaging the received first and second generator reactive currents, and determining a difference reactive current that is a difference between the received reactive current and the determined average generator reactive current. The method further includes the operations performed by the control system responsive to the received determined difference reactive current to at least one of the first and the second generators. The method also includes in an AVR of at least one of the first and the second generators, the operations of receiving the generated adjusted reactive current compensation and generating an adjusted generator control to control input of the at least one of the first and second generators responsive to the received adjusted reactive current compensation. The method also includes the operation in the at least one of the first and second generators receiving the adjusted generator control, and adjusting an operation of the generator in response to the received adjusted generator control.

According to further aspect, a system is provided for controlling a power generation system that has two or more generators connected in parallel operation with each generator having a terminal voltage and supplying a generator reactive power output to a common load. Each generator has a control input. The system includes an AVR with a generator reference voltage. The AVR has an input and has an output that is coupled to the control input of the at least one of the generators. The system also includes a parallel CCC element coupled to an input to the AVR. A control system includes a PIC, a memory, a processor, an input, an output and executable instructions. The control system is configured for receiving at the input, a reactive current of a controlled generator that is a selected one to be controlled of the two or more generators, a first generator reactive current from a first generator, and a second generator reactive current from a second generator. The processor is configured for executing the executable instructions for determining an average generator reactive current by averaging the received first and second generator reactive currents. The processor also configured for determining a difference reactive current that is a difference between the received reactive current and the determined average generator reactive current. The PIC is configured for receiving the determined difference reactive current and generating an adjusted reactive current compensation as a function of the received difference reactive current. The AVR is further configured for receiving the adjusted reactive current compensation and generating an adjusted generator control responsive to the received adjusted reactive current compensation. At least one of the first and the second generators is configured for receiving the adjusted generator control from the AVR and adjusting an operation of the generator in response to the received adjusted generator control.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 6 includes

FIG. 9 including

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

Figure 6A:
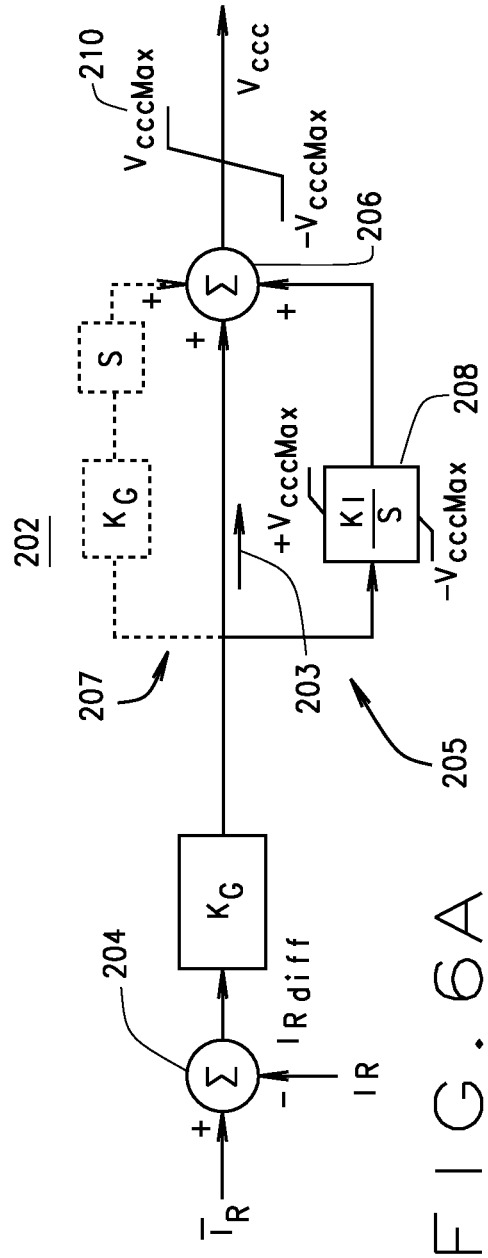
FIG. 6A and 6B are block diagrams of an improved control scheme for controlling two parallel generators using a modified cross-current compensation CCC, with FIG. 6A representing the control method and FIG. 6B representing the currently disclosed cross-current compensation modification to prior art FIG. 2, according to some exemplary embodiments.
Figure 6B:
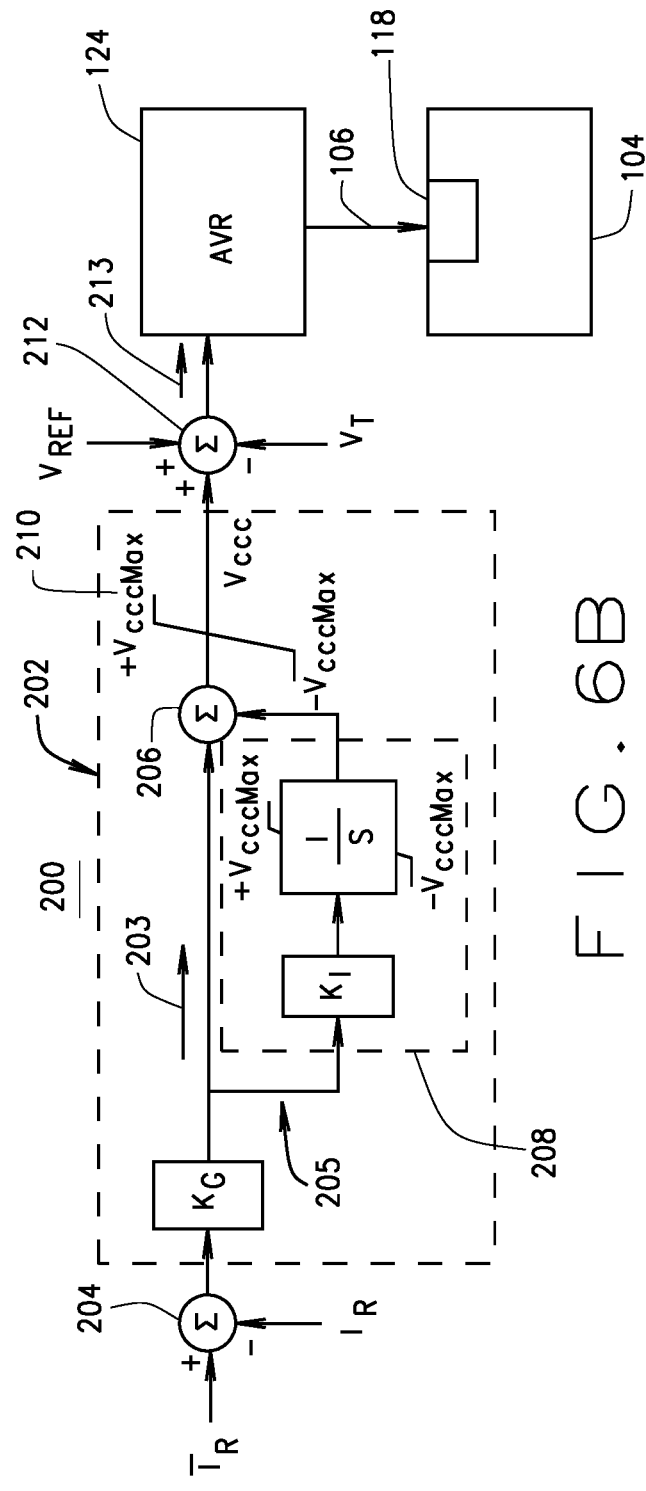
Figure 7:
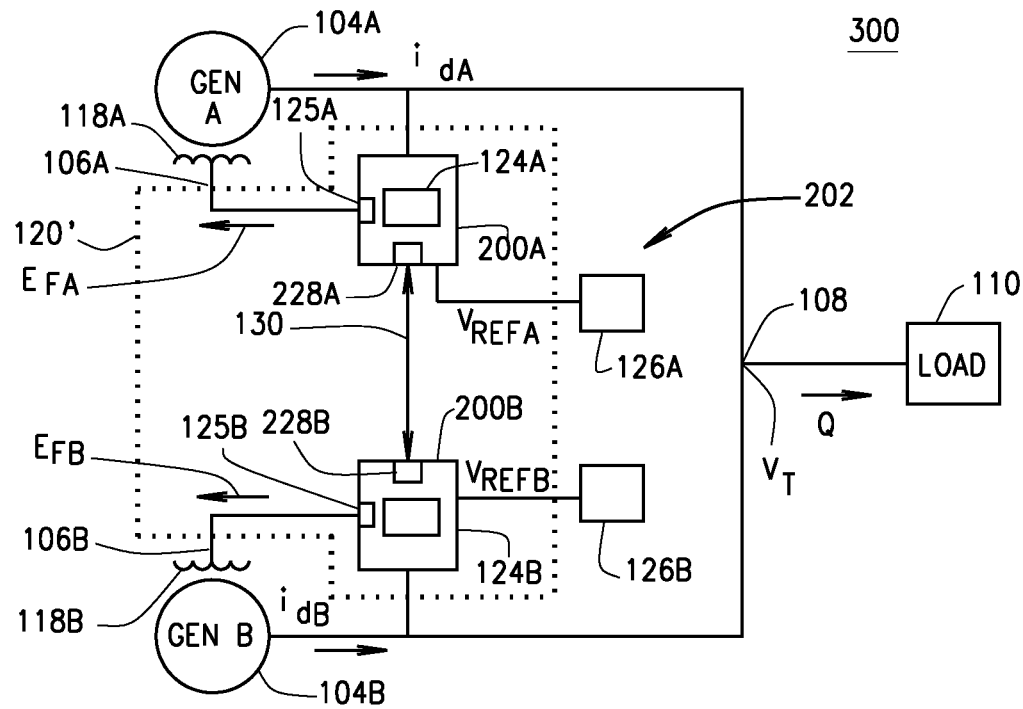
FIG. 7 is a block diagram of an improved cross-current compensation CCC two-generator power generation control system according to one exemplary embodiment.
Figure 8:
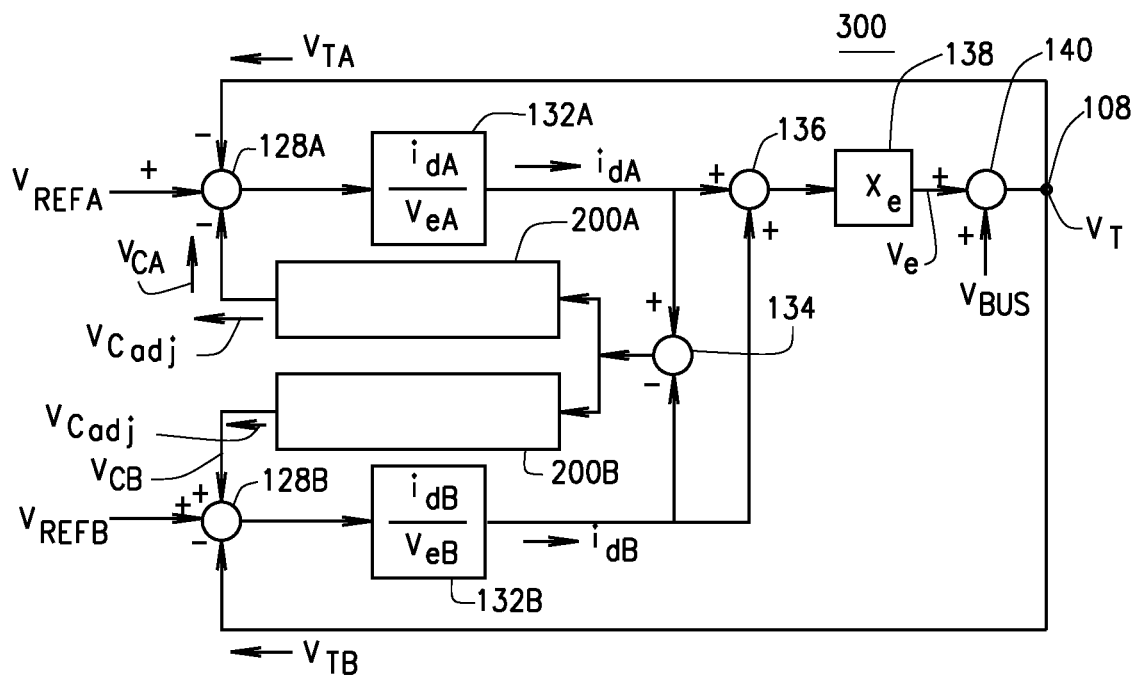
FIG. 8 is a block diagram of an improved power generation control system using the new advanced CCC control, as compared to the prior art CCC control system, as shown in FIG. 4.

The disclosed improved cross-current compensation CCC control system and method will be disclosed in more detail with reference to FIGS. 6-8. The present disclosure discloses a system and method of an improved CCC control system that uses a proportional integral controller PIC having an input, which is the difference between the reactive current of the controlled generators($I_{Rtar}$) and average reactive current of all other paralleled generators ($\overline{I_R}$). $K_G$ and $K_I$ are the PI gains. As the PIC provides that no steady state error will exit, the presently disclosed system and method provides for the improved stable and robust operation of the multiple generators. With the disclosed improved control system and method, when the reactive current difference is equal to or about zero, the system reacts as the conventional CCC. However, the improved control systems and methods provide an advantage over prior solutions by using an improved CCC control that reduces the unbalanced reactive current sharing due to any small difference between generator voltages of multiple generators. This improved control system and method solves the problems of conventional CCC implementations which have limitations, and also helps to eliminate the considerable amount of field testing required to determine the exact gains necessary to achieve proper reactive current sharing. As described herein, the control of the reactive power output of the generator is set forth by controlling the input to the generator field which is typically an input voltage. However, one of ordinary skill in the art would understand after reviewing this disclosure that the presently disclosed control system can also be implemented wherein a generator's reactive power output can be controlled by an input other than voltage, such as a current, or a combination of current and voltage, by ways of examples. Such embodiments are within the scope of the present disclosure, as the presently disclosed system and method is applicable to systems for controlling not only the voltage input to the generator, but also current and current and voltage in combination, including power, wherein a generator's reactive power output is configured to be controlled by such controlled inputs.

However, to fully appreciate the disclosure and the improved CCC control system and method, a quick review of the technology behind CCC control systems beyond that, and in more detail as addressed in the background section above will is provided.

Technical Background

Figure 1:
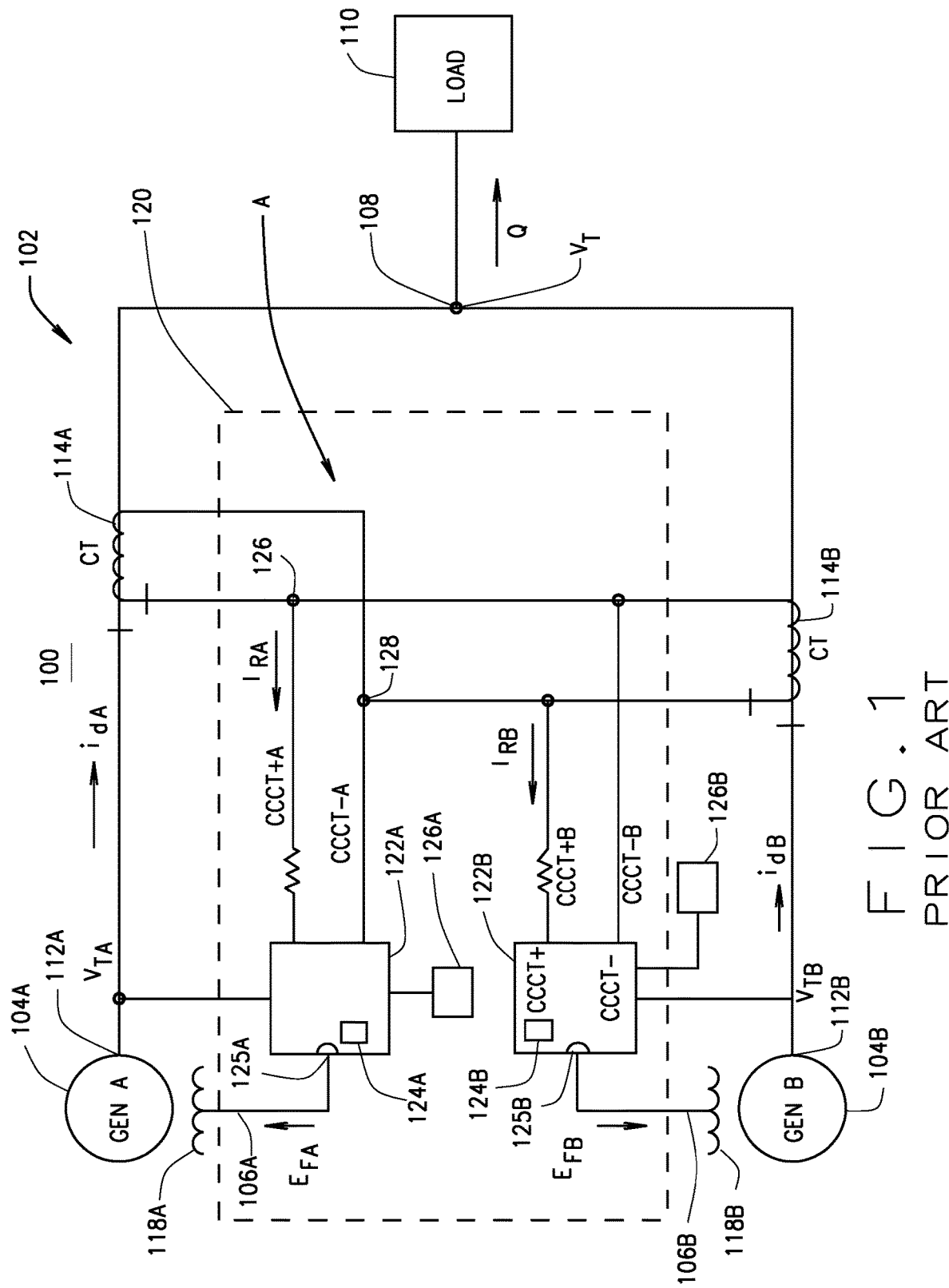
FIG. 1 is a block circuit diagram of a two parallel generator power generation system with cross-current compensation CCC in island mode, according to the prior art.
Figure 2:
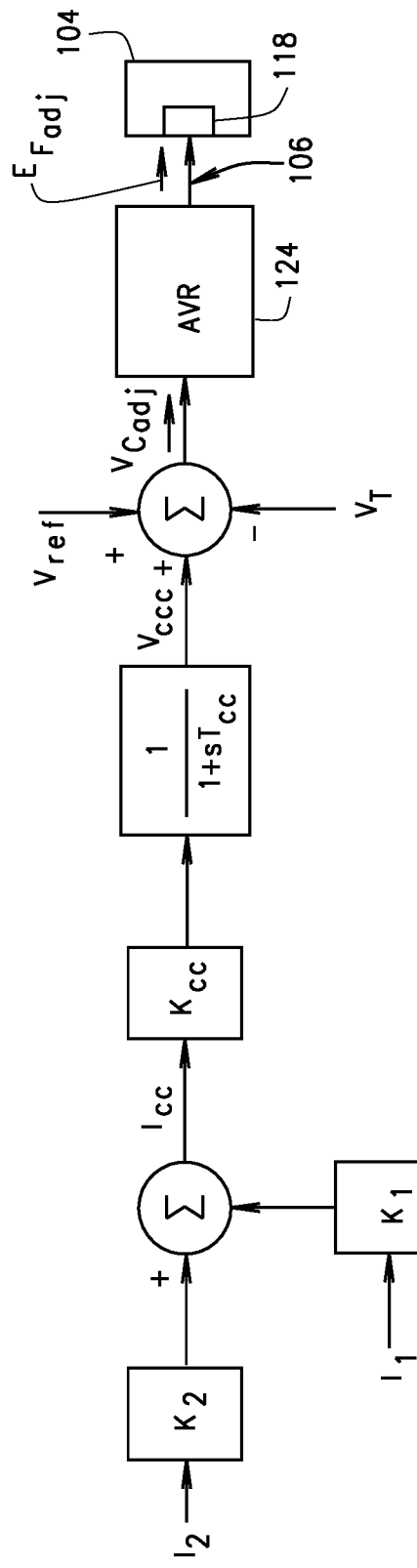
FIG. 2 is a block diagram of a mathematical model representing cross-current compensation CCC.

With conventional CCC element implementations as introduced above, the CCC element functionality is modeled as the block diagram as shown in FIG. 2. As shown in FIG. 2, the generator reactive current $I_d$ (or $I_R$) is shown as $I_1$ with $I_2$ being the average reactive current of the multiple generators. $T_{CC}$ is the effective filtering due to the hardware. The gains $K_1$ and $K_2$ are determined by the CTs, generator ratings, and system configuration for reactive currents $I_1$ (also referred to herein for generator 104A as IdA) and $I_2$ (also referred to herein for generator 104B as IdB), respectively. Gains $K_1$ and $K_2$ are summed to generate cross-current current $I_{CC}$ that is then adjusted by cross current gain $K_{CC}$. The gain $K_{CC}$ is the proportional gain used as an input to control the CCC element. Next, cross current as adjusted by $K_{CC}$ is applied to a filtering component that is inherently related to the system hardware. This adjustment includes an adjustment of the cross current gain based on the effective filtering variable $T_{CC}$ to provide voltage compensation $V_{CCC}$ (or simply $V_C$). The determined voltage compensation $V_C$ is then summed with the terminal voltage $V_T$ and the reference voltage $V_{REF}$ to produce a reactive current compensation $V_{Cadj}$ that is provided as an input to the AVR 124. For proper reactive power sharing among parallel generators, it is required to select the gains $K_1$ and $K_2$ based on power output and control settings of the paralleled generators. The performance of the multiple generators 104 using reactive current sharing is a function of the selected gains $K_1$ and $K_2$. As addressed above, each AVR 124 receives $V_{Cadj}$ and then utilizes the received $V_{Cadj}$ in determining and generating the adjusted generator field power $E_{Fadj}$ that is provided to the generator field input 106 of the generator 104.

As will be shown in the following section, higher levels of gain $K_{CC}$ produce less steady state error but decrease stability. Table 1 shows an example of the field test results with various gains cross current gains $K_{CC}$. Table 1 indicates that the larger steady state error is observed as the cross-current gain $K_{CC}$ decreases.

TABLE 1

Field test results of conventional CCC

| Load KVar | CCC $K_{CC}$ Gain | 75 KW Gen KVar | 100 KW Gen KVar |
|---|---|---|---|
| 72 KVar | 0% | 25.61 | 42.35 |
| 72 KVar | 1% | 31.72 | 40.73 |
| 72 KVar | 5% | 35.18 | 37.01 |

In order to estimate the steady state error in the reactive power Q and in particular the reactive current $I_d$ of each generator 104, the closed loop transfer function of the CCC control system 120 is derived using a simplified mathematical model. Based on this analysis, as disclosed herein, there is a need for an improved CCC element that provides for reduced sharing of unbalanced reactive current $I_d$ due to any small difference between generator voltages $V_T$.

As will be discussed and further addressed herein, the presently disclosed system and method for controlling of a CCC element has been tested using a commercial, digital AVR on two turbo-charged diesel gensets 104. Test results reflecting the benefits of the presently disclosed control system are also disclosed herein.

To accomplish the disclosed system and method additional technical and mathematical background is provided. The analysis of CCC control systems provides an examination of the relationship between the steady state error in reactive current sharing and the CCC gains $K_{CC}$. In order to understand the coupling between two generators 104, first an examination of the operation of two synchronous generators 104A, 104B connected to an infinite bus is described. The synchronous generators 104A, 104B are herein analyzed using the normal d-q axes representation as addressed in P. W. Sauer and M.A. Pai, "Power System Dynamics and Stability", 1998 by Prentice-Hall Inc.

The voltage equations of the synchronous machine with amortisseur effects ignored are given.

$$\frac{dE'_q}{dt} = \frac{-E'_q - (X_d - X'_d)i_d + E_{fd}}{T'_{do}} \quad (1)$$

$$\frac{dE'_d}{dt} = \frac{-E'_d + (X_q - X'_q)i_q}{T'_{qo}} \quad (2)$$

$$0 = (R_s + R_e)i_d - (X'_q + X_e)i_q - E'_d + V_s\sin(\delta - \theta_s) \quad (3)$$

$$0 = (R_s + R_e)i_q + (X'_d + X_e)i_d - E'_q + V_s\cos(\delta - \theta_s) \quad (4)$$

$$e_d = R_e i_d - X_e i_q + V_s\sin(\delta - \theta_s) \quad (5)$$

$$e_q = R_e i_q + X_e i_d + V_s\cos(\delta - \theta_s) \quad (6)$$

As used herein, $V_s$ is the per-unit infinite bus voltage and $Z_e = R_e + jX_e$ is Thevenin's equivalent impedance of the transmission network external to the synchronous machine. Further as described herein, for simplicity the active power is assumed to be zero ($i_q$ and $e_d = 0$). When $V_s$ is zero, $Z_e$ becomes the load impedance.

Reducing the model, the reactive component yields three equations:

$$\frac{dE'_q}{dt} = \frac{-E'_q - (X_d - X'_d)i_d + E_{fd}}{T'_{do}} \quad (7)$$

$$0 = (X'_d + X_e)i_d - E'_q + V_s \quad (8)$$

$$e_q = X_e i_d + V_s \quad (9)$$

Figure 3:
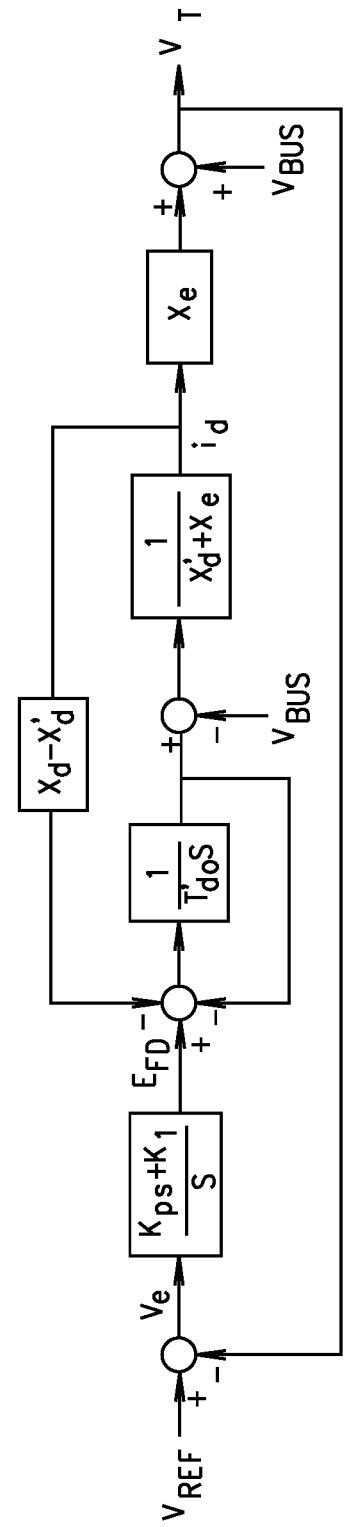
FIG. 3 is a block diagram of a mathematical model of a transfer function $i_d/V_{REF}$.

As disclosed herein, the improved control system includes a proportional-integral controller PIC to provide for improved regulation of the generated terminal voltage $V_T$ and in particular the generator reactive current $i_d$. When a generator 104 is connected to the grid load 110, the improved controller with the PIC controls the reactive current $I_d$ (also referred herein as $I_R$) of the CT 114 that is coupled via the AVR 124 to the generator field 118. An understanding of the control system and method is shown by equations as a closed loop transfer function as in FIG. 3 that is a block diagram of the transfer function $i_d/V_{REF}$ as referred herein Solving for steady state behavior, it is apparent that when only one generator 104 is used, there is no steady state error.

$$\frac{V_T}{V_{REF}} = \frac{X_e(K_p s + K_1)}{s((X'_d + X_e)T'_{do}s + X_e + X_d) + X_e(K_p s + K_1)}\bigg|_{s=0} = 1 \quad (10)$$

Therefore, the transfer function $i_d/V_e$ is expressed in equation (11) as:

$$\frac{i_d}{V_e} = \frac{K_p s + K_i}{s} \frac{i_d}{E_{FD}} \quad (11)$$

Where:

$$\frac{i_d}{E_{FD}} = \frac{1}{(x'_d + x_e)T'_{do}s + X_e + X_d} \quad (12)$$

For representing multiple generators 104, a second generator 104B is added in parallel to first generator 104A with a CCC loop $A_1$ included as seen in FIG. 4. With both of the two generators 104A, 104B connected with the CCC element, CCC loop gains for each generator, $C_1$ and $C_2$, are shown for each generator 104A, 104B. As shown, a summing point 128, shown as summing points 128A, 128B, for each control system 202 of each generator 104, receives the reference voltage $V_{REF}$, shown as $V_{REF1}$, $V_{REF2}$, with the terminal voltage $V_T$, and with the reactive current compensation voltage as provided by the respective cross-current compensation voltages $V_{C1}$, $V_{C2}$ from the cross-current compensation elements 122A, 122B, respectively. The differences provided by summing point 128 are provided or adjusted by the transfer function 132, shown as 132A, 132B. The reactive currents id, such as $i_{d1}$, $i_{d2}$ are provided as a shared input into summing point 134, the difference of which is provided to each of the CCC elements 122A, 122B. The reactive currents $i_{d1}$, $i_{d2}$ are also provided to summing point 136 to create a total reactive current $i_{dT}$ that is applied to an effective reactive impedance Xe 138 and is summed in summing point 140 to provide terminal voltage $V_T$.

Figures 4A, 4B:
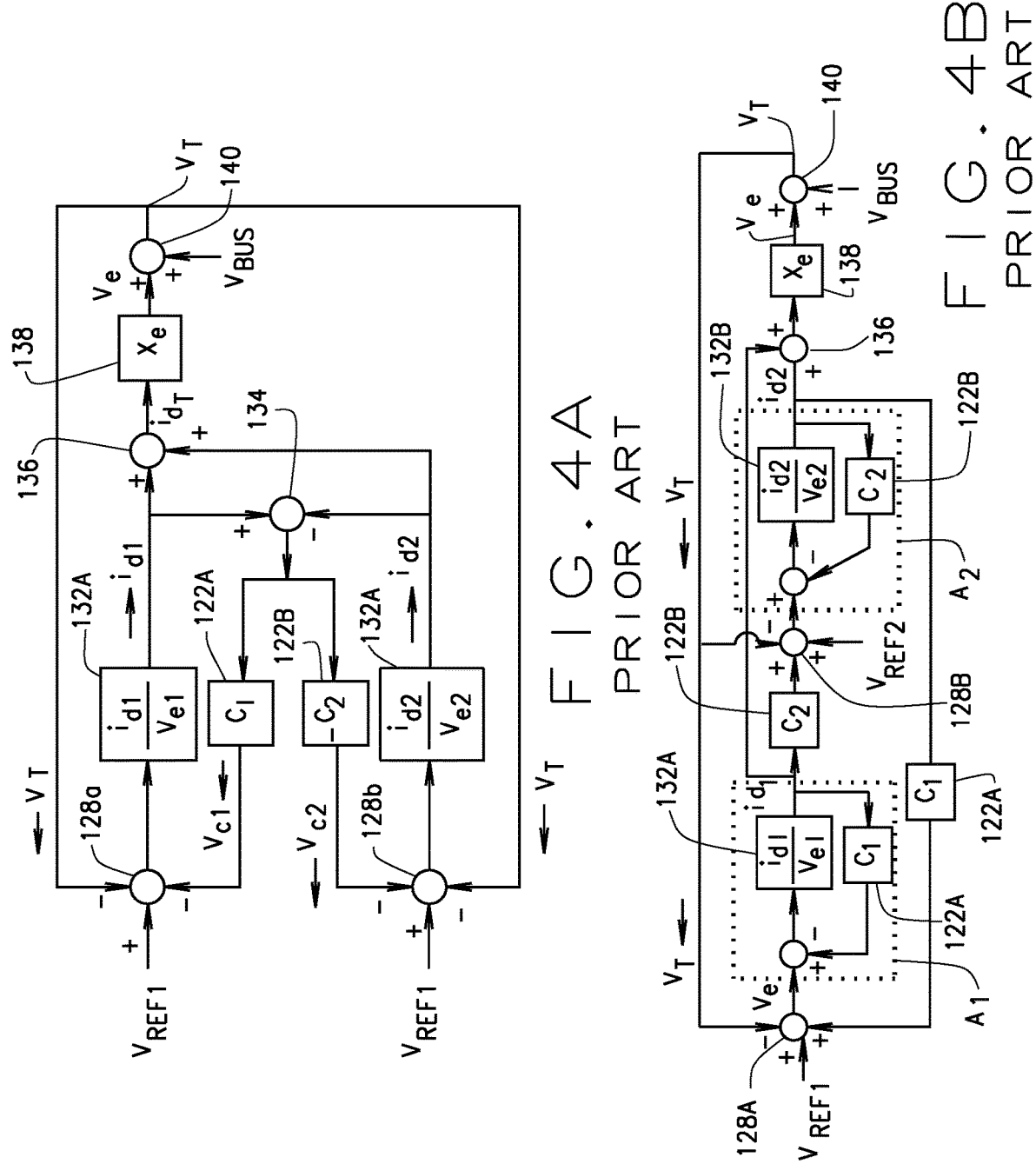
FIG. 4A includes two figures FIG. 4A and FIG. 4B, with FIG. 4A being a block diagram of a mathematical model for two generators connected with cross-current compensation CCC, and FIG. 4B being a block diagram of the FIG. 4A block diagram model illustrating the separation of the cross-current compensation CCC separated into two separate CCC loops.

For better illustration and understanding of the present disclosed system and method, the block diagram of FIG. 4A is rearranged to illustrate a way of decoupling the CCC loop $A_1$ by providing two separate CCC control loops $A_1$ and $A_2$ as shown in FIG. 4B, wherein $A_1$ is the transfer function from $V_{e1}$ to $i_{d1}$ with the conventional CCC gain $C_1$ as shown in FIG. 4B.

The closed loop transfer function of this exemplary two-generator system can now be derived by illustration.

The transfer functions of $i_{d1}/V_{e1}$ and $i_{d2}/V_{e2}$ are represented as the transfer function of $i_d/V_e$ for each generator, respectively. Thus, with the CCC loop $A_1$ becomes:

$$A_1 = \frac{i_d}{V_{REF}} = \frac{(K_p s + K_1)}{s((X'_d + X_e)T'_{do}s + X_e + X_d) + X_e(K_p s + K_1)} \quad (13)$$

From the block diagram of FIG. 4B, the reactive current $i_{d1}$ and terminal voltage $V_T$ of the first generator is derived as in (14).

$$i_{d1} = \frac{A_1(1 + A_2 X_e)V_{REF1} + (A_2 C_1 A_1 - A_2 X_e A_1)V_{REF2}}{1 - A_1 C_2 A_2 C_1 + A_1 C_2 A_2 X_e + A_2 C_1 A_1 X_e + A_1 X_e + A_2 X_e} \quad (14)$$

Terminal voltage $V_T$ is derived in (15) as:

$$V_T = \frac{(A_1 X_e + A_1 C_2 A_2 X_e)V_{REF1} + (A_2 X_e + A_2 C_1 A_1 X_e)V_{REF2}}{1 - A_1 C_2 A_2 C_1 + A_1 C_2 A_2 X_e + A_2 C_1 A_1 X_e + A_1 X_e + A_2 X_e} \quad (15)$$

From this, the steady states values are determined where s=0.

$$A_1\Big|_{ss} = \frac{K_p s + K_i}{S((X'_d + X_e)T'_{do}s + X_e + X_d) + C_1(K_p s + K_i)}\Big|_{s=0} = \frac{1}{C_1} \quad (16)$$

Similarly for $A_2$:

$$A_2\big|_{ss} = \frac{1}{C_2} \quad (17)$$

Then the steady state value of the terminal voltage $V_T$ becomes:

$$V_T\big|_{ss} = \frac{C_2 X_e V_{REF1} + C_1 X_e V_{REF2}}{C_2 X_e + C_1 X_e} \quad (18)$$

From equation (18), at steady state, the terminal voltage $V_T$ is equal to the reference voltage $V_{REF}$ only in the ideal scenario where both generator target reference generator field voltages (set points) and CCC loops $A_1$, $A_2$ are identical.

Reactive current $i_d$ at steady state $i_{dss}$ is obtained in a similar manner. Here the difference in the steady state reactive currents is due to the variation in reference voltage $V_{REF}$, i.e., metering voltage.

$$i_{d1}\big|_{ss} = \frac{\frac{V_{REF1}}{C_1} + \frac{V_{REF2}}{C_2} + \frac{X_e(V_{REF1} - V_{REF2})}{C_1 C_2}}{\frac{2X_e}{C_1} + \frac{2X_e}{C_2}} \quad (20)$$

$$i_{d1} - i_{d2}\big|_{ss} = \frac{V_{REF1} - V_{REF2}}{C_1 + C_2}$$

If the cross-current gains $K_{CC}$ and voltage references $V_{REF}$ are the same for each generator 104A, 104B, the reactive current $i_d$ is the ideal case of equation (21).

$$i_{d1}\big|_{ss, V_{REF1}=V_{REF2}, C_1=C_2} = \frac{V_{REF1}}{2X_e} \quad (21)$$

In order to derive the resultant reactive current $i_d$ for the disclosed improved control system for a CCC element 122, the CCC loop gains $C_1$ and $C_2$ are replaced with PICs.

Substituting a PIC into these reactive current equations provides the steady state value $i_{d1}$.

$$C_1 = K_{p1} + \frac{K_{i1}}{s} \quad (22)$$

$$C_2 = K_{p2} + \frac{K_{i2}}{s} \quad (23)$$

$$i_{d1}\big|_{ss} = \frac{V_{REF1} K_{i_2} + V_{REF2} K_{i_1}}{2X_e(K_{i_1} + K_{i_2})} \quad (24)$$

As such, the disclosed improved CCC element 122 with a PIC will follow the output of the CCC element 122 with zero integral. This is very useful when it is used for the combined load compensation (line drop/droop and CCC). By way of example, if only one of the multiple generators 104, such as a first generator 104A, is a controlled generator that is a selected one of the multiple generators to be controlled by the improved CCC element utilizing PIC as a control input, i.e., assuming that a second generator is only controlled by a conventional CCC element such as loop $A_2$, then loop gain $C_2=K_{p2}$, then the resultant reactive current $i_{d1}$ is determined by the reference voltage $V_{REF2}$ of the generator 104B without the integral control.

$$i_{d1}\big|_{ss} = \frac{V_{REF2} K_{i_1}}{2X_e(K_{i_1})} = \frac{V_{REF2}}{2X_e} \quad (25)$$

Figure 5:
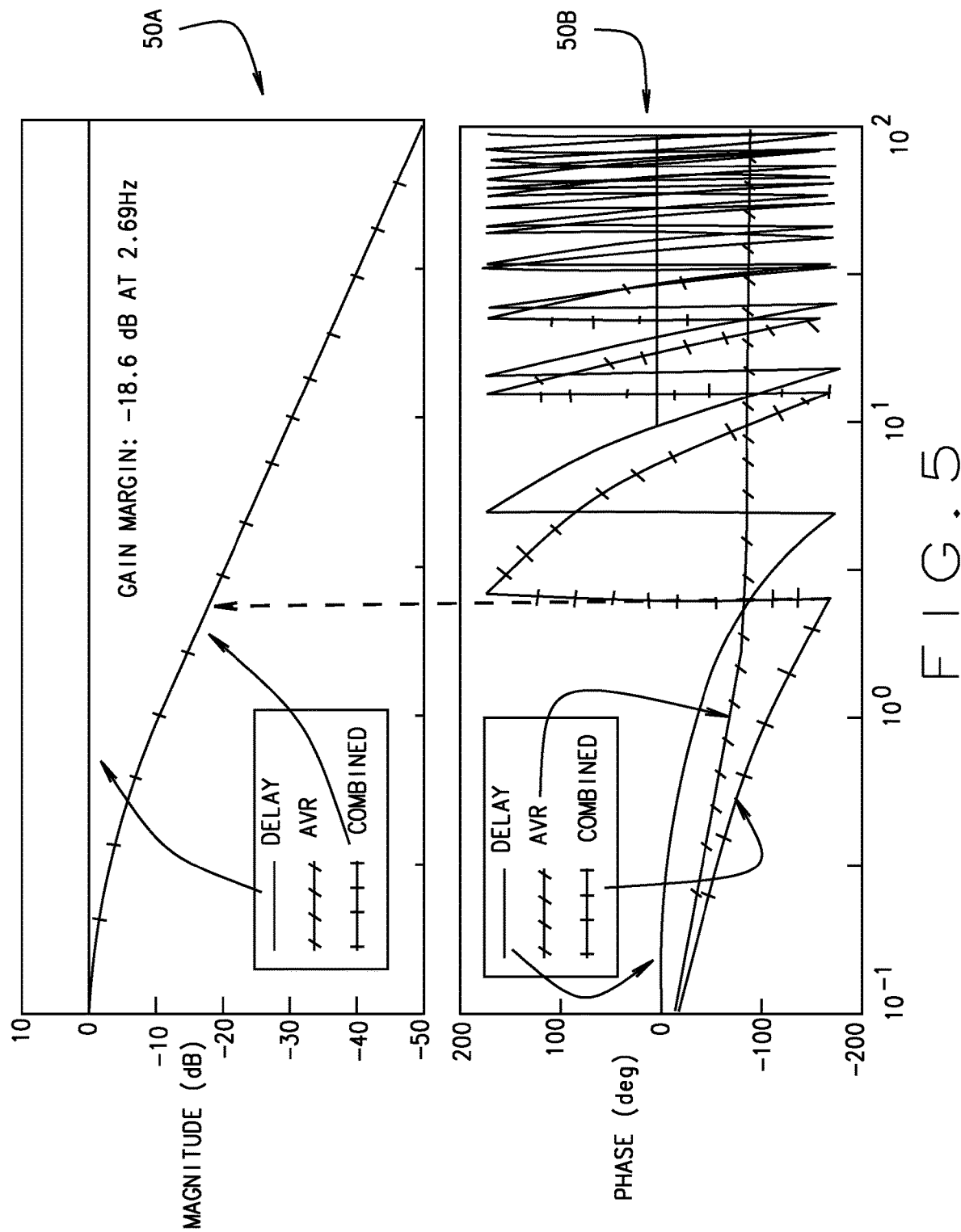
FIG. 5 is a Bode plot of a typical automatic voltage regulator AVR loop as known in the art.

Improved operations of a CCC element 122 can also be achieved using network load sharing of reactive current $i_q$. For this embodiment, the cross-current gain $K_{CC}$ is limited by the time delay in the communication between the two CCC loops $A_1$ and $A_2$ and their respective AVRs 124, which by way of example, can be due to a delay caused by a communication link 130 (as shown in FIG. 7) such as may occur when using an Ethernet or wireless network for the communications between the two CCC 122 systems. In general, for many practical implementations a time delay of about 100 msec due to the communication link is considered typical. FIG. 5 shows the bode plot of a typical voltage loop with phase delay corresponding 100 msec time delay. FIG. 5 includes plot 50A showing the magnitude in dB for each of the delay as well as the combination of the delay and the AVR output. Plot 50B shows the phase in degrees for each of the AVR, the delay and the combined. FIG. 5 plots 50A and 50B illustrate a gain margin of −18.6 dB, i.e., 0.1175 at 2.69Hz. Thus, the improved CCC control system will be unstable if the system gain K>8.8=1/0.1175 for a linear system. For the delayed system, the improved CCC control element can become unstable if K>5.5. With this gain $K_{CC}$, the steady state error is more than 15% of the required reactive current $i_q$.

Improved CCC Control System and Operation

Based on this technical background review, the presently disclosed improved CCC control system and method are generally described.

Some embodiments of an improved control system for controlling a power generation having two or more generators connected in parallel operation are herein disclosed. Each generator has a terminal voltage and supplies a generator reactive power output at a generator output to a common load. Each generator has a generator field control input coupled to an automatic voltage regulator (AVR) that receives a generator field voltage from a generator field voltage source. The power generation system also has a parallel cross-current compensation element (CCC) coupled to the output of each generator for receiving terminal voltage and to the AVR. The CCC element provides a reactive current compensation input to the AVR responsive to the received terminal voltage or reactive current of the generator. As understood, the parallel cross-current compensation element CCC could include a droop compensation element as well.

The improved control system has a proportional-integral PI controller, a memory for storing executable instructions, an input for receiving a reactive current of a controlled generator selected to be controlled from among the two or more generators. The input also is configured for receiving a first generator reactive current from the output of a first generator and a second generator reactive current from an output of a second generator. Of course, more than two generators could be implemented and controlled by the presently disclosed system and method. The disclosed system can receive the reactive current of the non-associated generator in an analog format as conventional CCC elements often provide. In another embodiment, each AVR that is associated with each of the plurality of generators can provide the reactive current of its associated generator to the AVRs for each of the other generators via a digital communication channel or link as described herein. A processor is coupled to the memory and is configured for executing the stored executable instructions for determining an average generator reactive current by averaging the received first and second generator reactive currents, and determining a difference reactive current that is a difference between the received reactive current and the determined average generator reactive current. The system includes a proportional-integral PI controller PIC configured for receiving the determined difference reactive current, and determining an adjusted reactive current compensation value, and providing the determined adjusted reactive current compensation value as an input to the AVR associated with the controlled generator. The proportional-integral PI controller can be configured to receive first and second gains $K_I$, $K_G$ as input settings. When received, the proportional-integral PI controller can be configured to generate the adjusted reactive current compensation responsive to the received first and second gains $K_I$, $K_G$ input settings.

As noted above, in some embodiments, the proportional-integral controller could also be a proportional, integral, differential PID controller as well. Further, the PIC could be implemented separately or as a component or element of the parallel cross-compensation element CCC.

In some embodiments, the improved control system can include the AVR that is coupled to the generator wherein the AVR is configured for receiving the adjusted reactive current compensation value from the PIC, and generating an adjusted generator field voltage that is an adjustment from the generator field set point voltage of the controlled generator responsive to the received adjusted reactive current compensation value. The AVR would then provide the adjusted generator field voltage to the generator field control input of the controlled generator that includes the generated adjusted generator field voltage value. There can also be an adjusted power or adjusted current as suitable for input to the generator for controlling an operation of the generator based thereon.

The proportional-integral PI controller and the AVR, alone or in combination, can be configured for determining a reactive current difference between to the first and second generators. When determined reactive current difference is not equal to zero, the control system provides the adjusted generator field voltage that includes the generated adjusted generator field voltage. When the determined reactive current difference is equal to zero, the provided adjusted generator field voltage is a function of the received reference voltage and the current compensation input from the CCC element.

In some embodiments, the adjusted reactive current compensation value can include an adjusted generator field control voltage value. In such embodiments, a voltage summing input can be provided at an input to the AVR associated with the controlled generator, and configured for receiving the adjusted generator field control voltage value, a reference voltage from a reference power source, and the current compensation input from the CCC element. In such embodiments, the AVR utilizes each, at least in part, for generating of the adjusted generator field voltage.

In operation, this method of controlling each of a set of multi-generators connected in parallel can be described as including the improved operational control processes that includes receiving a reactive current of a controlled generator that is selected to be controlled from among the two or more generators, receiving a first generator reactive current from the output of the first generator, and receiving a second generator reactive current from the output of the second generator. The method then includes determining an average generator reactive current by averaging the received first and second generator reactive currents, and determining a difference reactive current that is a difference between the received reactive current and the determined average generator reactive current. Next, the method includes providing the determined difference reactive current to an input of a proportional-integral PI controller, and generating an adjusted reactive current compensation value as a function of the determined difference reactive current. Once this is completed, the method provides the adjusted reactive current compensation value has an input to the AVR associated with the controlled generator for use thereby in controlling the controlled generator. As noted above, in some embodiments, the proportional-integral PI controller has an input for receiving first and second gains $K_I$, $K_G$ as input settings to the proportional-integral PI controller. In such embodiments, the process of generating of the adjusted reactive current compensation is responsive to the received first and second gains $K_I$, $K_G$ input settings.

In some embodiments where the AVR is included, the method can include receiving the adjusted reactive current compensation value, generating an adjusted generator field voltage value that is an adjustment from the generator field voltage of the controlled generator responsive to the received adjusted reactive current compensation value, and providing an adjusted generator field voltage to the generator field control input of the controlled generator. In other embodiments, a system and method is disclosed that provides for controlling a power generation system having two or more generators connected in parallel operation. In such embodiments, the power generation and control system includes an AVR associated with each generator, a parallel cross-current compensation element CCC, and an improved control system having a proportional-integral PI controller. Each automatic voltage regulator (AVR) has a generator reference voltage associated with each of the two or more generators, and has an input and has an output that is coupled to the generator field control input of associated generator. The parallel cross-current compensation element CCC is coupled to an input of each AVR for providing current compensation to each AVR. The control system for each generator with the proportional-integral PI controller has a memory, a processor, an input, a control output, and executable instructions. Each control system can be configured for receiving at the input, a reactive current of the generator associated therewith, a generator reactive current from the output its generator, and a generator reactive current from the output of one or more of the other generators.

The control system includes executable instructions for determining an average generator reactive current by averaging the received generator reactive currents, and determining a difference reactive current that is a difference between the received reactive current and the determined average generator reactive current. The proportional-integral PI controller is configured for receiving the determined difference reactive current and generating an adjusted reactive current compensation value as a function of the received difference reactive current.

The AVR is configured to receive a reference voltage from a reference voltage source, and receive current compensation from the parallel cross-current compensation element CCC. It is further configured to receive the determined adjusted reactive current compensation value from the control system and generate an adjusted generator control responsive to the received adjusted reactive current compensation value, the received reference voltage, and the received current compensation. In some embodiments, the control system is configured for generating the adjusted reactive current compensation value as an adjusted generator field voltage value. In such embodiments, the generated adjusted generator field voltage is provided to a voltage summing input of the AVR of the controlled generator along with the received reference voltage and the received current compensation. In some embodiments, the AVR is configured to generate as the adjusted generator control an adjustment from the generator field voltage provided to the generator field control input of the controlled generator. Also The associated generator to be controlled, referred herein as the controlled generator, receives the adjusted generator control from the AVR and adjusts an operation of the generator in response to the received adjusted generator control.

Referring now to the exemplary embodiments of the drawings, as shown an improved CCC control system 202 and method of operation is illustrated by exemplary embodiment in FIG. 6, including FIGS. 6A and 6B, as well as in FIGS. 7 and 8. As illustrated, the implementation of the improved CCC control system 202 provides for an improved multiple generator power generating system 200. As shown in FIGS. 7A, 7B and 8, the improved CCC control system 202 and method of operational control includes a proportional-integral controller PIC 202. As disclosed herein, the present system 202 refers to a PIC generally, but as one of ordinary skill in the art will understand, the reference to a PIC can include not only a proportional-integral PI controller but also a proportional, integral, derivative (PID) controller, but is referred herein, unless otherwise specifically stated, as a PIC.

FIG. 6A illustrates the PIC element 202 that is a proportional integral PI controller that generates the voltage compensation level $V_{ccc}$ with $K_G$ and $K_I$ representing the proportional and integral input gains to the PI, respectively. This can be also be referred to as a summing point type controller in this example having two loops, with a voltage regulator forming an inner loop. The PIC element 202 computes at summing point 204 the reactive current difference $I_{Rdiff}$ between the controlled generator (the generator to be controlled) and the average reactive current of all other paralleled generators $I_{RAVG}$ ($I_R$) as an input. The difference between the received reactive current of the controlled generator unit ($I_R$) and average reactive current of all other paralleled generators $I_{RAVG}$ ($I_R$) is then fed into the input of the PIC element 202, where it is adjusted by the predetermined proportional gain $K_G$ that establishes stability to the control and improves transient response. The lower outer integral loop 205 utilizes an integral gain module 208 that comprises the predetermined integral gain $K_I$ for reducing steady state error in the control. The output of this lower outer integral loop 205 is a stable and robust response where no steady state error exists.

The reactive current difference passes through the PI Controller after being adjusted by the proportional gain $K_G$, as stated above. It passes through two internal control loops. The first loop is a proportional loop 203, where the reactive current is received by a summing point 206. The second internal loop is the lower outer integral loop 205 with the integral gain module 208, which is also received by the summing point 206. The integral gain module 208 receives the reactive current that was initially passed through $K_G$ and applies the integral gain $K_I$ to it. The integral gain module 208 has a limiting capability therewith, in that if the reactive current exceeds a maximum limit, or is lower than a minimum limit, the integral gain module will limit the output to a predetermined value to being a maximum value, $V_{cccMax}$, where the reactive current exceeds this upper limit value, and a minimum value, $-V_{cccMin}$, where the reactive current falls below this lower limit value.

At summing point 206, the reactive current from the first proportional loop 203 and the reactive current from the second integral loop 205 are received. Those reactive currents are summed together. The output $V_C$ of summing point 206 is then received by a limiter 210. The limiter 210 receives the output $V_C$ of summing point 206 and is configured to bind the output $V_C$ to within a predetermined upper limit $V_{cccMax}$ and a predetermined lower limit $-V_{cccMin}$. The output of the limiter 210 is then provided as the output $V_C$ of the PIC element 202.

When the reactive current difference is equal to or about zero, the presently disclosed system, an example embodiment of which is shown in FIG. 6, reacts in a similar manner to a conventional CCC. However, when the reactive current difference is not equal to or about zero, the improved controller 200 with the PIC 202, and method of operation thereof, provides a closed loop feedback control for controlling and then balancing of the operations of the generators 104 by adjusting the generator field control input $E_F$ as provided to the controlled generator 104 in near real time operation by control system output $V_C$ until the reactive current difference is equal to or about zero. The output of the integral loop 205 and the proportional loop 203 are summed at summing point 206 and then passed through a limiter 210. As noted above, a proportional integral derivative PID controller also having derivative loop 207 can also be implemented as the PI controller 210 and still be within the scope of the present disclosure. FIG. 6A illustrates the optional derivative loop 207 in dashed lines. As such, derivative gain $K_d$ provides a derivative compensation that can also be provided to summing point 206 before the limiter and for determining the voltage compensation $V_C$.

A maximum adjustment of the generator by an adjusted generator field input level $E_{FADJ}$, as provided by the control system output $V_C$ is limited to within the established upper and lower limits of the limiter 210e, $V_{cccMax}$ or $-V_{cccMax}$, that restricts its output within the maximum variation of the terminal voltage $V_T$. By way of example, as shown in FIG. 6A, if the determined compensation voltage is initially $V_{Ci}$ greater or less than $V_{cccMax}$ or $-V_{cccMax}$, the output $V_{ccc}$ (or simply $V_C$) is $V_{cccMax}$ or $-V_{cccMax}$, respectively. In this case, the integral action of the adjusted output $V_C$ is deactivated, or limited by the limiter 210 to within the upper limit $V_{cccMax}$ and the lower limit $V_{cccMin}$.

The proportional plus integral control functionality of the improved control system 202 using the PIC as shown in FIG. 6A is illustrated in operation in generator control system 200 of FIG. 6B. The proportional and integral gains $K_G$ and $K_I$ are predetermined. The new controller element 202 provides the output value $V_{ccc}$ to a summing point 212. Summing point 212 receives as inputs the reference voltage $V_{REF}$, which is fixed based on predetermined operating parameters of the system 200, and the terminal voltage $V_T$, which is the voltage at the terminal of the controller generator, and the output value $V_{ccc}$ from the PIC element 202. The output 213 of the summing point 212 represents the adjusted reactive current compensation value, and is provided as an input to the AVR 124 as the adjusted voltage error input level. In response, the AVR 124 generates an adjusted generator field output value that is then provided to the generator field control input 106 to the generator field 118 of the generator 104.

While not shown, as discussed above, it should be understood to those of ordinary skill in the art after reviewing this disclosure that the disclosed improved CCC control method is applicable to the combined load CCC system with line drop compensation and reactive current compensation, which is utilized to improve system voltage support while maintaining stability of the paralleled units. Further, it should be understood that, while FIGS. 6A and 6B illustrate a proportional-integral PI controller, as noted above, a proportional, integral, differential PID controller can be utilized as controller 202.

The performance of the disclosed improved CCC control system and method has been validated using two diesel gensets, 125 kVA, rated 208 Vac and 1,800 rpm. Since both generating sets were equipped with a rotary exciter, the PID controller was used with the PID gains of $K_{PR}=5$; $K_{IR}=10$; $K_{DR}=0.2$; and $T_{DR}=0.01$.

The disclosed improved CCC control system 200 and control method was applied to the two generators in the tests both in island mode and while connected to the grid as a load. The performance of reactive current compensation sharing based on droop compensation was tested with 0.5% of voltage error to consider the industrial environment. This error included uncertainties in the system equipment such as machine impedance, line impedances, and calibration errors in the generator terminal voltage, by way of example. Three different methods were compared for the testing of the parallel operation in the island system test. A voltage mismatch between two generators was added to the 2nd generator of $V_{REF1}=1.005$. This was tested with 5% of droop compensation. The CCC gains were $K_{G1}=K_{G2}=0.1$ and $K_{11}K=1.0$.

FIG. 7 illustrates the two generators system 300 utilizing the improved CCC control system 202 wherein each generator has a separate dedicated AVR 124A, 124B, that is communicatively connected via a direct (as shown) or indirect data connection 220. The improved control loop 120' includes the improved control system 202 that can include improved CCC element 200, shown as 200A, 200B, in FIG. 8. FIG. 8 includes a data connection 220, which can be of any type suitable communication medium for providing the one or more other AVRs, through their data communication interfaces 228A, 228B, with the reactive current $i_d$ of its associated generator, and can also be utilized to share other data such as, in some embodiments, its generated adjusted reactive current compensation values $i_C$. As shown, AVR 124A is coupled to the output of generator 104A and receives reactive current $i_{dA}$ as generated thereby. AVR 124A has an output 125A coupled to generator field control input 106A that provides generator field voltage $E_{FA}$ and/or adjusted generator field voltage $E_{Fadj}$ to generator field 118A of generator 104A. Similarly, AVR 124B is coupled to the output of generator 104B and receives reactive current $i0_{dB}$ as generated thereby. AVR 124B has an output 125B coupled to generator field control input 106B that provides generator field voltage $E_{FB}$ to generator field 118B of generator 104B. As shown, each AVR 124A, 124B, can receive referenced power or voltage $V_{REF}$ via reference power sources 222A, 222B, respectively.

As shown in FIG. 8 in view of FIG. 7, the new improved control system 300 and method utilizes the improved CCC for control of the reactive power generation of the two or more generators having transfer functions $i_{d1}/V_{e1}$ and $i_{d2}/V_{e2}$, respectively. As shown in FIG. 8, the improved CCC controller 202 provides as an output adjusted reactive current compensation $V_C$ that is provided to a summing point of each AVR. When the reactive current difference is equal to or about zero, the improved CCC controller 102 provides for CCC control by the AVR the same as a conventional CCC. However, when the reactive current difference is not equal to or about zero, the improved CCC control 202 provides the AVR 124 with an additional $V_C$ adjustment $V_{Cadj}$, shown as $V_{CadjA}$, $V_{CadjB}$, as an input as provided by the closed loop feedback of the PIC, as shown by way of example in FIGS. 6, 7 and 8. As such, the improved CCC controller 102 provides a new and different feedback control input to the AVR 124 as compared to the prior art convention CCC system of FIG. 4. By so doing, the improved system 102 provides further adjustment to the output of the AVR when the determined reactive current difference is unbalanced or equal to or about zero. Each AVR 124 can receive an adjusted reactive current compensation $V_C$ from the improved CCC controller 102 and in response generates an improved adjusted generator control in the form of an adjusted generator field voltage $E_{FADJ}$ that is provided to the generator field control input of the associated generator 104. In response, each generator 104 receiving the improved adjusted generator control as provided by the $E_{FADJ}$ adjusts an operation of the generator 104 in response thereto, which results in a change or adjustment to the reactive power generated by the generator 104. By doing so, the multiple generators 104 are controlled to bring the reactive current difference back to equal to or about zero thereby stabilizing the reactive current more quickly and accurately than a conventional CCC control system.

Figure 9A:
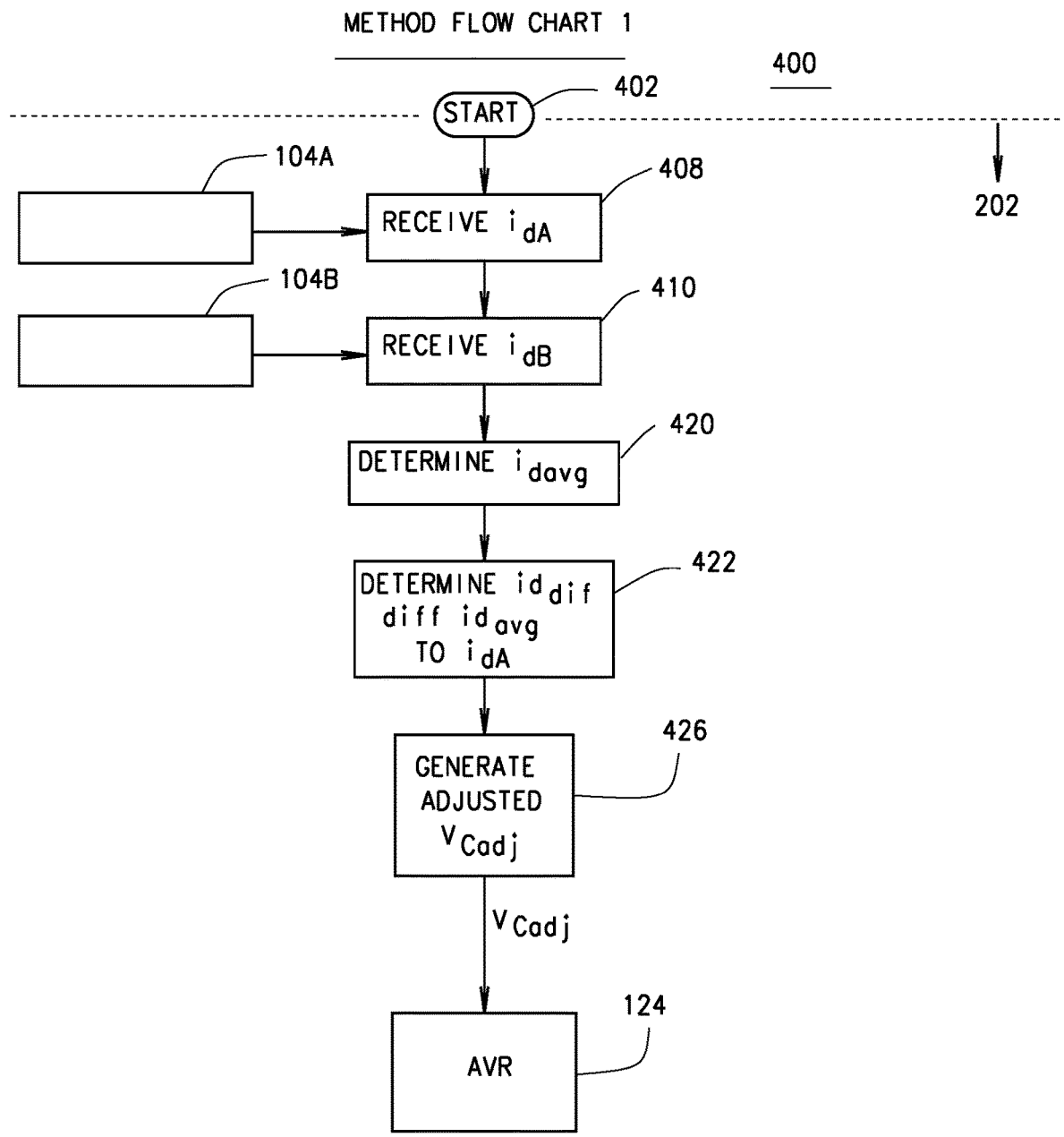
FIGS. 9A and 9B is a flow chart of a method of controlling multiple generators in a multiple generator power system using the disclosed improved cross-current compensation according to various embodiments.
Figure 9B:
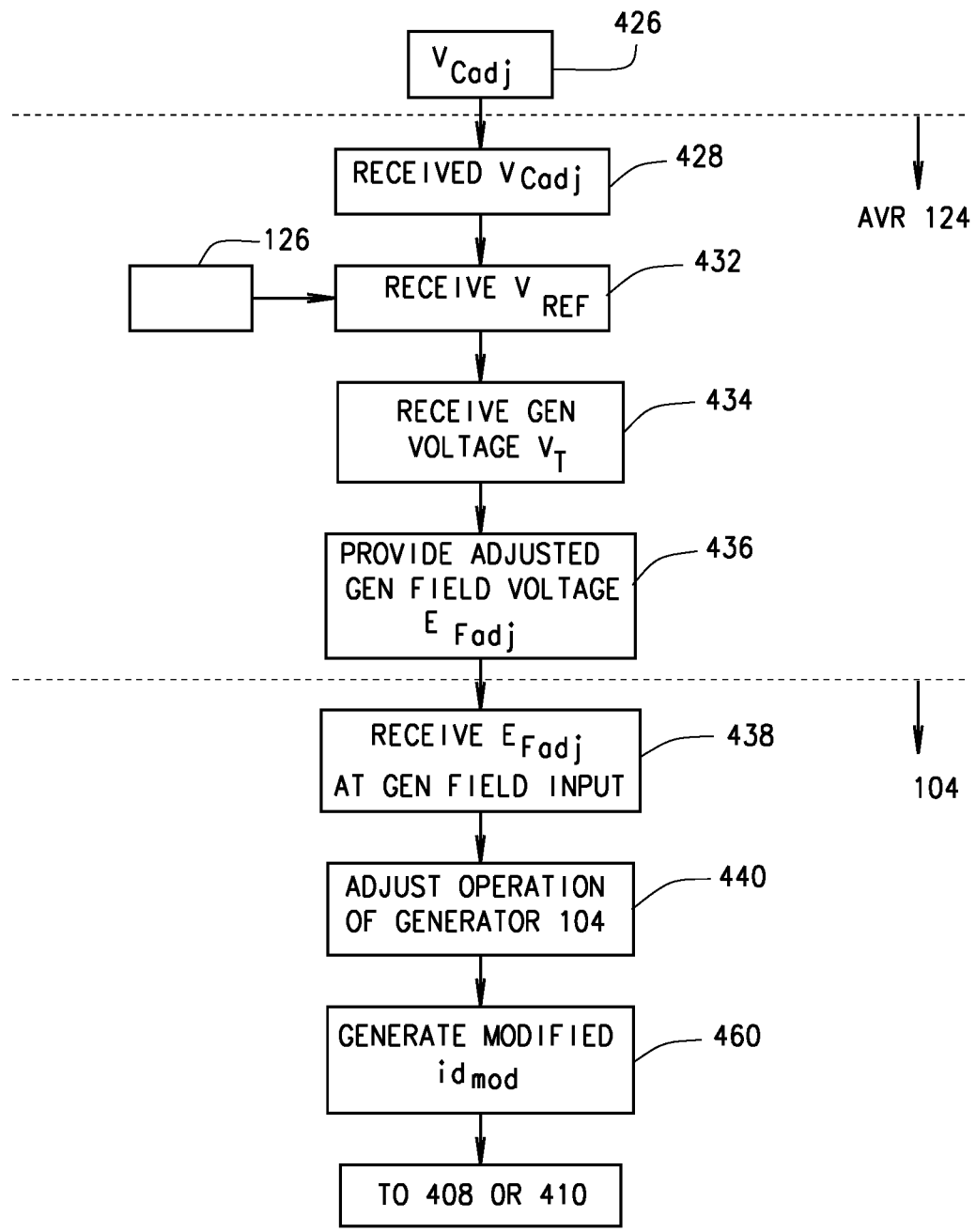

One embodiment of the describe method for controlling multiple parallel generators is shown in the flow chart of FIG. 9, that includes FIGS. 9A and 9B. Process 400 of FIG. 9A illustrates an exemplary process for improved control system 202 that starts at the static start point 402. The process then receives an input 408 the reactive current $i_{dA}$ from generator 104A, and receives in process 410 the reactive current $i_{dB}$ from generator 104B. Of course in practice, there can be more than two generators 104 and therefore more than two received reactive currents $i_d$. The control system 202 then determines the average el $i_{davg}$ of the received reactive currents $i_{dA}$, $i_{dB}$ in process 420, and compares them in process 422 to determine a difference between the determined average of the received reactive currents $i_{davg}$ and the reactive current $i_d$ of the controlled generator 104. The PIC controller 202 generates an adjusted $V_{Cadj}$ in process 426 based on the inputs the PIC controller 202 receives process 408 ($i_{dA}$), process 410 ($i_{dB}$), process 420 ($i_{davg}$) and process 422 ($i_{Rdiff}$). Process 426 provides the determined $V_{Cadj}$ to the AVR 124.

Figure 10A:
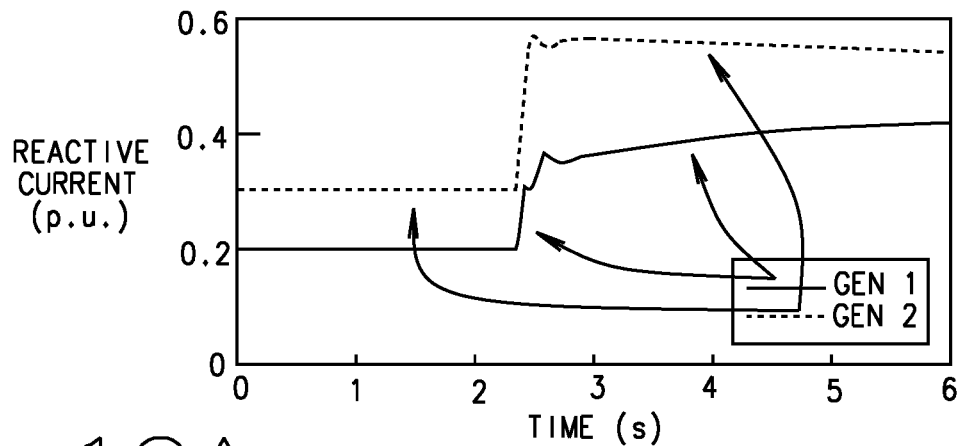
FIG. 10 includes FIGS. 10A, 10B and 10C, each of which is a time chart illustrating the reactive power sharing using droop compensation FIG. 10A, conventional cross-current compensation CCC, FIG. 10B, each as compared to the improved control system in FIG. 10C.
Figure 10B:
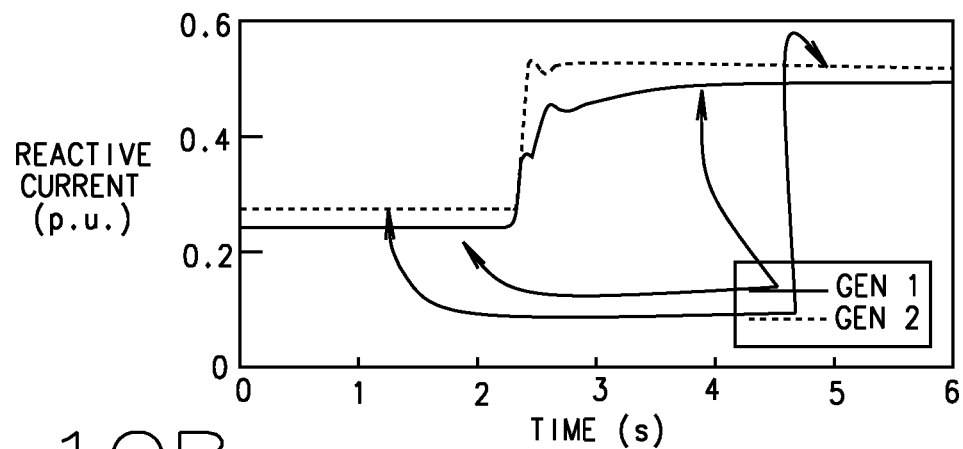
Figure 10C:
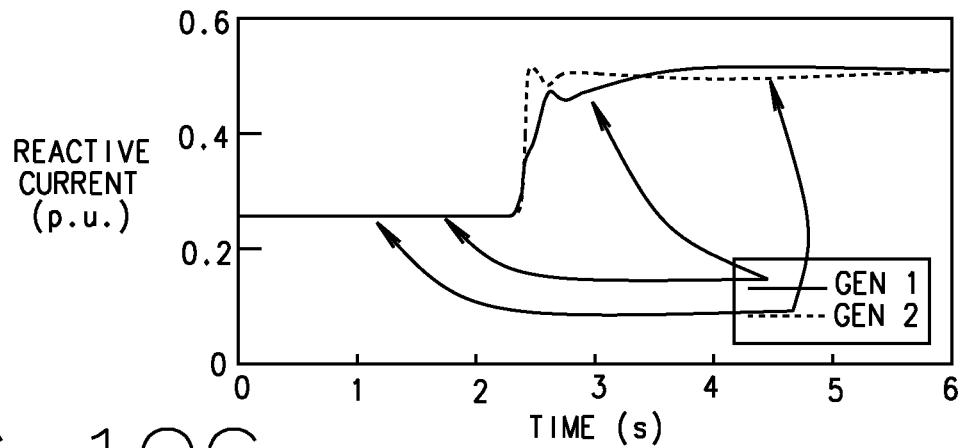

Process 400 can also include the processes not only of the improved control system 202 as shown in FIG. 9A, but also the operations of the AVR 124 and the controlled processes of the controlled generator 104 as shown in FIG. 9B. After the AVR 124 receives the adjusted $V_{Cadj}$ from process 426 in process 428, the reference voltage $V_{REF}$ from the reference voltage source 126 in process 432. The AVR 124 then generates an adjusted generator field $E_{Fadj}$ to the generator field control input 106 to generator field 118 of the generator 104 in process 436. In the generator, the process continues with the generator field control input 106 receiving the adjusted generator voltage $E_{Fadj}$ in process 438 and providing an adjustment of the operation of the generator 104, such as a change in the operating characteristics of the generator field powering in process 440. As a result, the generator 104 creates an adjusted or modified reactive power and current output in process 460. This includes a modified reactive current $i_{dmod}$ that is then flowed back to process 408 or process 410 based on the generator or back to the start 402. FIG. 10 illustrates a comparison of the reactive power sharing performance of the improved system as compared to the prior art systems and methods. Initially two generators 104 share active power of 70 kW and reactive power of 60 kvar. At the time of about 2.2 seconds, reactive power of 60 kvar was added. As illustrated in FIG. 10A, there is a considerable reactive current sharing error in the droop mode. As shown in FIG. 10B, when the conventional CCC is applied, an improvement in reactive current sharing is achieved. However, as shown, a steady state error in the reactive current sharing is still present with conventional CCC. FIG. 10C illustrates the improved performances of the disclosed improved CCC control system wherein no steady state error was observed. This illustrates the resulting improvement of performance as compared to that of the droop mode in FIG. 10A and that of the conventional CCC in FIG. 10B.

Table 2 shows the steady state values of the reactive power Q comparing three different improved control systems having different gains as compared to the droop and conventional CCC genset control systems. It is assumed for the CCC mode that $K_{G1}=K_{G2}=0.1$.

TABLE 2

| Steady state values of the reactive power Q | | |
|---|---|---|
| | $Q_1$ | $Q_2$ |
| Droop | 0.40 | 0.55 |
| Conventional CCC $K_{f1} = K_{f2} = 0$ | 0.486 | 0.513 |
| Newly disclosed CCC $K_{f1} = 0.0$, $K_{f2} = 1.0$ | 0.4971 | 0.4971 |
| Newly disclosed CCC $K_{f1} = 1.0$, $K_{f2} = 0.0$ | 0.502 | 0.502 |
| Newly disclosed CCC $K_{f1} = K_{f2} = 1.0$ | 0.4998 | 0.4998 |

Where multiple generators 104 are connected to the grid/load, such as where two generators 104A, 104B are connected to the same power bus, reactive current compensation can be performed with three different methods: droop, conventional CCC, and the improved CCC control system and method. Total real power can be assumed as 0.9 p.u. A combined load compensation with CCC and droop compensation was configured for a test. The CCC gains were $K_G=0.1$ and $K_f=0.1$. The systems were tested with 2% of droop compensation.

Initially the generators were operated with the improved CCC with 2% of droop. The results of three tests sequences are illustrated in FIG. 11 as follow:

(a) Cross-current mode is disabled at 2.4 seconds.
(b) The conventional CCC is enabled at 2.4 seconds.
(c) The improved CCC is enabled at 2.4 seconds.

Figure 11A:
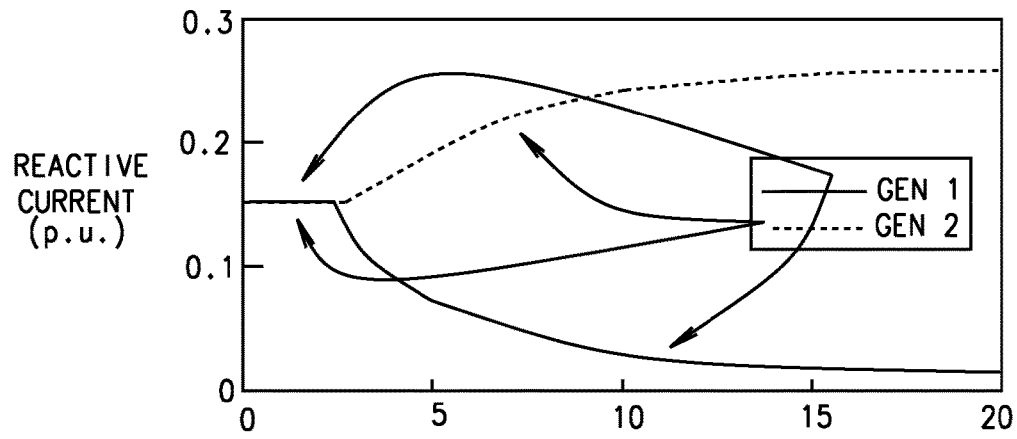
FIG. 11 includes FIGS. 11A, 11B and 11C each of which is a time chart illustrating the reactive power sharing using droop compensation FIG. 11A, conventional cross-current compensation CCC of FIG. 11B, and each as compared to the improved control system in FIG. 11C.
Figure 11B:
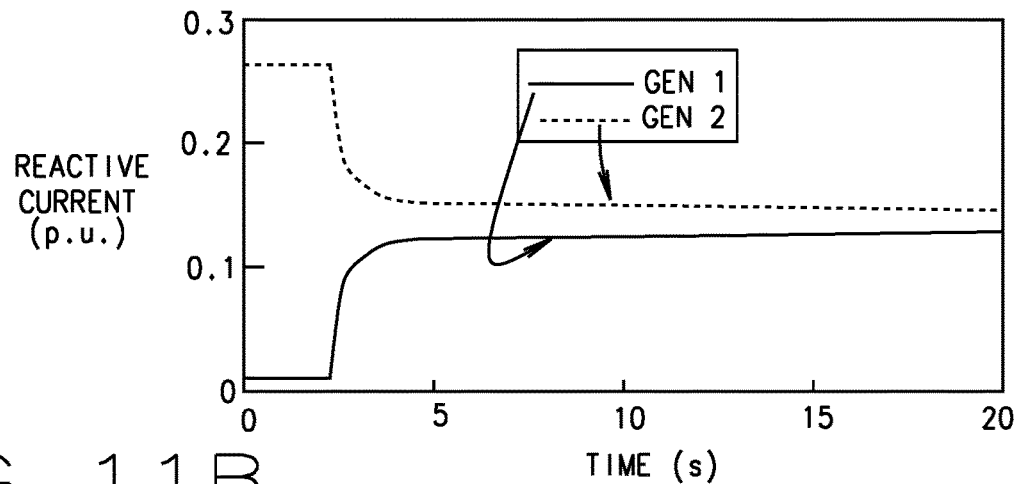
Figure 11C:
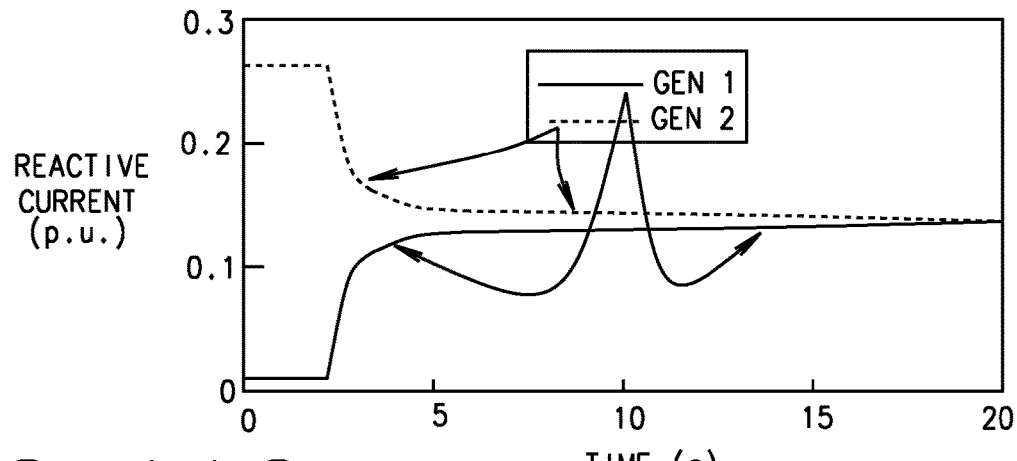

As shown in FIG. 11A, when no CCC element is provided, there are considerable errors in reactive current. When the conventional CCC is enabled (as shown in FIG. 11B), the multiple generators 104A, 105B try to share the reactive current. However, steady state error exists due to difference between two generator voltages. The improved control system and method that utilizes a reactive power as inputs to a PIC that then generates an adjusted reactive current compensation as a new input to the CCC control system, that then adjusts the output generator field voltage $E_{FADJ}$ that controls the generator to eliminate the state steady error as shown in FIG. 11C.

As shown, the performance of the improved CCC control system and method has been tested for two generators in island mode and also when connected to the grid/load. The new CCC control loop was shown to be more robust and to outperform the conventional cross-current control systems and methods.

Utilization of the improved CCC control system and method not only improves performance and stability of a multiple generator power control system providing power to a common load or grid, but also eliminates the need for estimating the wiring line impedances or generator impedances. Thus, with the improved CCC control systems and method, the commissioning of reactive current sharing for multiple gensets can be quickly accomplished with excellent performance results.

Computer Operating Environment for The Improved CCC Control System

Figure 12:
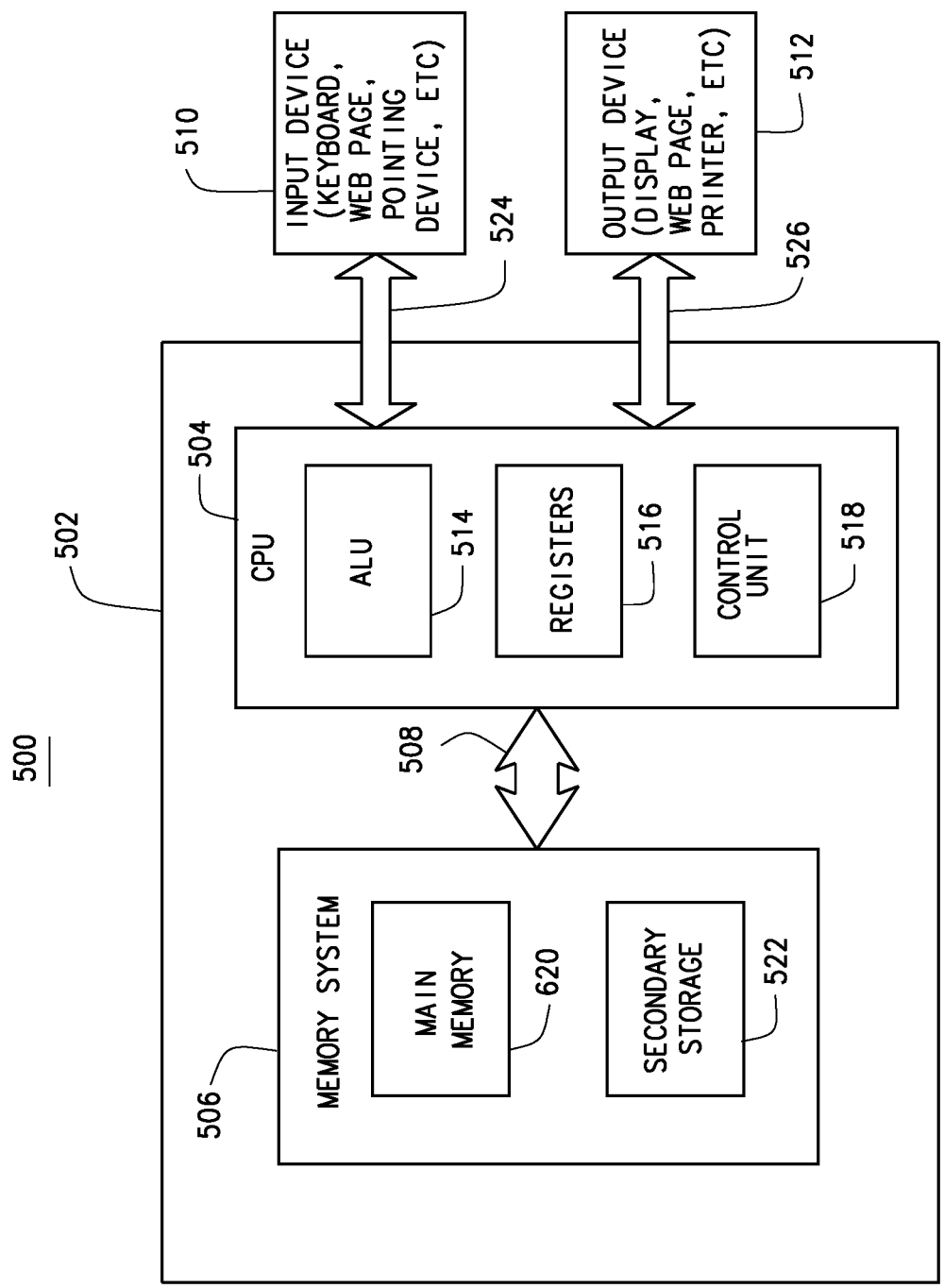
FIG. 12 is a block diagram of a computer system suitable for use with a control system according to various embodiments.

Referring to FIG. 12, an operating environment for an illustrated embodiment of a system and/or method for an control system for controlling multiple generators and methods as described herein is a computer system 500 with a computer 502 that comprises at least one high speed central processing unit (CPU) 504, in conjunction with a memory system 506 interconnected with at least one bus structure 508, an input device 510, and an output device 512. These elements are interconnected by at least one bus structure 524, 526. In an alternative embodiment, the control systems and methods can be implemented in a stand-alone device, or incorporated into another component in the system which provides the just-described operating environment.

As addressed above, the input and output devices can include a communication interface including a graphical user interface. Any or all of the computer components of the network interface and communications systems and methods can be any computing device including, and not limited to, a lap top, PDA, Cell/mobile phone, as well as potentially a dedicated device. The software can be implemented as any "app" thereon and still within the scope of this disclosure.

The illustrated CPU 504 is of familiar design and includes an arithmetic logic unit (ALU) 514 for performing computations, a collection of registers 516 for temporary storage of data and instructions, and a control unit 518 for controlling operation of the computer system 500. Any of a variety of micro-processors are equally preferred but not limited thereto, for the CPU 504. This illustrated embodiment operates on an operating system designed to be portable to any of these processing platforms.

The memory system 506 generally includes high-speed main memory 520 in the form of a medium such as random access memory (RAM) and read only memory (ROM) semiconductor devices that are typical on a non-transient computer recordable medium. The present disclosure is not limited thereto and can also include secondary storage 522 in the form of long term storage mediums such as floppy disks, hard disks, tape, CD-ROM, flash memory, etc., and other devices that store data using electrical, magnetic, and optical or other recording media. The main memory 520 also can include, in some embodiments, a video display memory for displaying images through a display device (not shown). Those skilled in the art will recognize that the memory system 1006 can comprise a variety of alternative components having a variety of storage capacities.

Where applicable, an input device 510, and output device 512 can also be provided in the system as described herein or embodiments thereof. The input device 510 can comprise any keyboard, mouse, physical transducer (e.g. a microphone), and can be interconnected to the computer 502 via an input interface 524, such as a graphical user interface, associated with or separate from the above described communication interface including the antenna interface for wireless communications. The output device 512 can include a display, a printer, a transducer (e.g. a speaker), etc., and be interconnected to the computer 502 via an output interface 526 that can include the above described communication interface including the antenna interface. Some devices, such as a network adapter or a modem, can be used as input and/or output devices.

As is familiar to those skilled in the art, the computer system 500 further includes an operating system and at least one application program for executable instructions. The operating system is the set of software which controls the computer system's operation and the allocation of resources. The application program is the set of software that performs a task desired by the system and method of the control system and or any of the above described processes and processes using computer resources made available through the operating system.

In accordance with the practices of persons skilled in the art of computer programming, the present disclosure is described below with reference to symbolic representations of operations that are performed by the computer system 500. Such operations are sometimes referred to as being computer-executed. It will be appreciated that the operations which are symbolically represented include the manipulation by the CPU 504 of electrical signals representing data bits and the maintenance of data bits at memory locations in the memory system 506, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above as to memory system 506.

The foregoing disclosure thus discloses multiple systems and methods which can be made up of various elements and steps which may or may not be present in any particular system or method to be used at particular time or in a particular setting, and thus discloses many permutations of systems and methods. The foregoing disclosure allows for variation and selection of features, elements and steps depending upon the user or users.

When describing elements or features and/or embodiments thereof, the articles "a", "an", "the", and "said" are intended to mean that there are one or more of the elements or features. The terms "comprising", "including",-and "having" are intended to be inclusive and mean that there may be additional elements-or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

The invention claimed is:

1. A method of controlling a power generation system having two or more generators connected in parallel operation, any one of which being a reference generator and one or more other generators, each generator having a terminal voltage and supplying a generator reactive power output at a generator output to a common load, each generator having a generator field control input coupled to an automatic voltage regulator (AVR) generator reference voltage, the power generation system also having a parallel cross-current compensation element (CCC) coupled to the output of each respective generator for receiving an associated reactive current from each respective generator and coupled to the associated AVR for providing a current compensation input to the AVR responsive to the received reactive currents, the method comprising:
receiving a reference reactive current from said reference generator;
receiving a generator reactive current from each of the one or more other generators;
determining an average generator reactive current by averaging the one or more received reactive currents, respectively, from the one or more other generators;
determining a difference reactive current that is a difference between the received reference reactive current and the determined average generator reactive current;
providing the determined difference reactive current to an input of a proportional-integral PI controller;
generating an adjusted reactive current compensation value as a function of the determined difference reactive current; and
providing the adjusted reactive current compensation value as an input to the AVR associated with the reference generator.

2. The method of claim 1 wherein in the AVR, the process includes:
receiving the adjusted reactive current compensation value;
generating an adjusted generator field voltage value that is an adjustment from the generator field voltage of the reference generator responsive to the received adjusted reactive current compensation value; and
providing an adjusted generator field input voltage to the generator field control input of the reference generator that includes the generated adjusted generator field voltage value.

3. The method of claim 2, further comprising:
determining a reactive current difference between the received reactive currents of said one or more other generators, and wherein when the determined reactive current difference is not equal to or about zero, the providing of the adjusted generator field input voltage includes the generated generator field voltage value, and when the determined reactive current difference is equal to or about zero the provided adjusted generator field input voltage is a function of the received reference voltage and the generator terminal voltage, and does not include the CCC compensation input.

4. The method of claim 1 wherein the reference generator is included in the one or more other generators, the AVR is the AVR associated with the reference generator and the proportional-integral PI controller is a reference proportional-integral PI controller; further comprising:
providing the received reactive current of the reference generator to the AVR associated with each of the one or more other generators, wherein in the AVR of each of the one or more other generators, the method further comprising generating an adjusted generator field voltage value that is an adjustment from a generator field voltage of the associated one or more other generators responsive to the received reactive current from said reference AVR, and providing said generator field voltage to a generator field control input of each other generator that includes the generated adjusted generator field voltage value.

5. The method of claim 1 wherein the generating of the adjusted reactive current compensation value includes determining an adjusted compensation voltage and providing the adjusted compensation voltage to a voltage summing input of the AVR associated with the reference generator, the voltage summing input also receiving a reference voltage from a reference power source and the current compensation input from the CCC element.

6. The method of claim 1 wherein the reference generator is included in the one or more other generators and has a reference generator field control input receiving a reference generator field reference voltage, and the AVR is the reference AVR associated with the reference generator, further comprising:
receiving a reactive current from at least one of the other generators;
determining a second difference reactive current that is a difference between the received_ second reactive current from at least one of the other generators and the determined average generator reactive current;
providing the determined second difference reactive current to an input to a proportional-integral PI controller associated with the at least one AVR associated with the at least one other generator;
generating a second adjusted reactive current compensation value as a function of the determined second difference reactive current; and
providing as an input to the at least one AVR associated with the at least one other generator the second adjusted reactive current compensation value.

7. The method of claim 6 wherein in the AVR associated with the at least one other generator, the method further comprising:
receiving the second adjusted reactive current compensation value;
generating a second adjusted generator field voltage value that is an adjustment from a second generator field voltage of the at least one other generator responsive to the received second reactive current compensation value, and
providing a second adjusted generator field voltage to a generator field control input of the at least one other generator that includes the generated second generator field voltage value.

8. The method of claim 1 wherein in the proportional-integral PI controller the method further comprising:
receiving first and second gains $K_1$, $K_G$ as input settings to the proportional-integral PI controller; and
wherein the generating of the adjusted reactive current compensation is responsive to the received first and second gains $K_I$, $K_G$ input settings.

9. The method of claim 1 wherein the proportional-integral controller is a component of the parallel cross-current compensation element (CCC).

10. The method of claim 1 wherein the proportional-integral PI controller is a proportional integral derivative PID controller and wherein the step of providing the difference reactive current to the input of the proportional-integral PI controller is providing the input to the PID controller.

11. A system for controlling a power generation system having two or more generators connected in parallel operation, said two or more generators including one reference generator and one or more other generators, each generator having a generator field control input coupled to an automatic voltage regulator (AVR) that receives a generator field voltage from a generator field voltage source, each generator also having an output with a terminal voltage configured to supply a generator reactive power to a common load, the power generation system also having a parallel cross-current compensation element (CCC) coupled to the output of each generator for receiving two or more reactive currents from the two or more generators, the parallel CCC also coupled at an output to the reference generator AVR and for providing a reactive current compensation input to the reference generator AVR responsive to the two or more received reactive currents, the system comprising:
  a memory for storing executable instructions;
  an input for receiving a reference reactive current from the output of said reference generator, and one or more inputs for receiving a reactive current from an output of each of said one or more other generators;
  a processor coupled to the memory and configured for executing the stored executable instructions including determining an average generator reactive current by averaging the one or more reactive currents from the other generators, and determining a difference reactive current that is a difference between the reference reactive current and the determined average generator reactive current;
  a proportional-integral PI controller configured for receiving the determined difference reactive current, and determining an adjusted reactive current compensation value; and
  the system configured to provide the determined adjusted reactive current compensation value as an input to the reference generator AVR associated with the reference generator.

12. The system of claim 11, further comprising:
  the reference generator AVR being configured for receiving the adjusted reactive current compensation value, generating an adjusted generator field voltage that is an adjustment from the generator field voltage of the reference generator responsive to the received adjusted reactive current compensation value, and providing the adjusted generator field input voltage to the generator field control input of the reference generator that includes the generated adjusted generator field voltage value.

13. The system of claim 11, wherein the PI controller and the reference generator AVR are configured for:
  determining a reactive current difference between the reference generator and the average of the one or more other generators, and wherein when the determined reactive current difference is not equal to or about zero; and
  the PI controller generating an adjusted generator field voltage based on the determined reactive current difference generator field voltage,
  wherein the adjusted generator field voltage combines proportional control with additional integral adjustments for providing the reactive current difference being equal to or about equal to zero.

14. The system of claim 11, wherein the PI controller further includes a differential control loop and is a PID controller, and wherein the PID controller and the reference generator AVR are configured for:
  determining a reactive current difference between the reference generator and the average reactive current of the at least one or more other generators, and wherein when the determined reactive current difference is not equal to or about zero; and
  the PI controller generating an adjusted generator field voltage based on the determined reactive current difference generator field voltage,
  wherein the adjusted generator field voltage combines proportional control with additional integral and derivative adjustments for providing the reactive current difference being equal to or about equal to zero.

15. The system of claim 11, wherein the reference generator is included in the one or more other generators and the AVR is a reference generator AVR associated with the reference generator and the adjusted generator field voltage value is a first adjusted generator field voltage value, further comprising the system configured for providing the reactive current of the reference generator to an AVR of at least one of the other generators and the AVR associated with each of the at least one of the other generators for receiving the reference reactive current, generating a second adjusted generator field voltage value that is an adjustment from a generator field voltage of the at least one other generator responsive to the received reference reactive current, and for providing a second adjusted generator field input voltage to a generator field control input of the at least one other generator.

16. The system of claim 11 wherein, in response to receiving the adjusted reactive current compensation value, the reference generator AVR is configured for providing an adjusted generator field power input to the generator field control input of the reference generator.

17. The system of claim 11 wherein the system is configured for providing the adjusted reactive current compensation value to a voltage summing input at an input to the reference generator AVR, wherein the voltage summing point is configured for receiving the generator terminal voltage, a reference voltage from a reference voltage source, and the current compensation input from the CCC element, and wherein the generating of the adjusted generator field input voltage is responsive at least in part to each input to the voltage summing point.

18. The system of claim 11 wherein the PI controller is a proportional integral derivative (PID) controller.

19. The system of claim 11 wherein the proportional-integral PI controller is configured for:
  receiving first and second gains $K_I$, $K_G$ as input settings to the proportional-integral PI controller; and
  wherein the generating of the adjusted reactive current compensation is responsive to the received first and second gains $K_I$, $K_G$ input settings.

20. The system of claim 11 wherein the proportional-integral PI controller is configured as a component of the parallel cross-current compensation element.

21. A method of controlling a power generation system having a reference generator and at least one or more other generators connected in parallel operation with each generator having a terminal voltage and supplying a generator reactive power output at a generator output to a common load, each generator having a generator field control input coupled to an automatic voltage regulator (AVR) and that receives a generator field voltage from a generator field voltage source, the power generation system also having a parallel cross-current compensation element (CCC) coupled to the output of each generator for receiving reactive current from each respective generator and coupled to each respective AVR associated with each respective generator for providing a reactive current compensation to each respective AVR, the method comprising:
  (a) in a control system having a proportional-integral PI controller, a memory storing executable instructions, an input, an output coupled to the parallel cross-current compensation element, and a processor coupled to the memory and operable for executing the stored executable instructions, performing the operations of:
receiving at the input a reactive current of said reference generator;
receiving at the input a reactive current from each of said one or more other generators;
determining an average generator reactive current by averaging the received reactive currents from each of said one or more other generator;
determining a difference reactive current that is a difference between the received reactive current from said reference generator and the determined average generator reactive current; and
generating an adjusted reactive current compensation value responsive to the received determined difference reactive current; and
(b) in an automatic voltage regulator (AVR) associated with the at least one of the one or more other generators:
receiving the adjusted reactive current compensation value; and
generating an adjusted generator control input to generator field control input of the reference generator responsive to the received adjusted reactive current compensation;
(c) in the reference generator:
receiving the adjusted generator control input; and
adjusting an operation of the reference generator in response to the received adjusted generator control.

22. The method of claim 21 wherein in the AVR associated with the reference generator, the method further comprising:
generating as the adjusted generator control input an adjustment to a power provided to the generator field control input of the reference generator.

23. The method of claim 21 wherein the determining of the adjusted reactive current compensation value includes providing a voltage summing input of the AVR associated with the reference generator, the method further comprising:
in the voltage summing point: receiving a reference voltage from a reference voltage source; and receiving the current compensation input from the CCC element, wherein the generating of the adjusted control voltage input is responsive to an output of the voltage summing point of the AVR associated with the reference generator.

24. The method of claim 21 wherein the control system proportional-integral PI control is a proportional integral derivative (PID) controller.

25. The method of claim 21 wherein in the control system the method further comprising:
receiving first and second gains $K_I$, $K_G$ as input settings to the proportional-integral PI controller;
wherein the generating the adjusted reactive current compensation is responsive to the received first and second gains $K_I$, $K_G$ input settings.

26. A system for controlling a power generation system having a reference generator and at least one or more other generators connected in parallel operation with each generator having an output, a terminal voltage and supplying a generator reactive power output via the output to a common load, each generator having a generator field control input, the power generation system comprising:
an automatic voltage regulator (AVR) with a generator reference voltage associated with each of the two or more generators, each AVR having an input and having an output that is coupled to the generator field control input of the associated generator;
a parallel cross-current compensation element CCC coupled to an input of each AVR of the two or more generators and configured for receiving a reactive current from each associated generator and providing a reactive current compensation to each associated AVR; and
a control system for each of the two or more generators, each control system having a proportional-integral PI controller, a memory, a processor, a first input, a second input, an control output, and executable instructions, each control system being configured for receiving at the first input, the reactive current of the associated generator and for receiving at the second input an average generator reactive current determined by averaging the reactive currents from each of the at least one or more other generators;
the executable instructions for each control system configured for performing the operation of determining the average generator reactive current by averaging the received reactive currents of each of the at least one or more other generators, and determining a difference reactive current that is a difference between the received reactive current of the associated generator and the determined average generator reactive current of the at least one or more other generators,
each proportional-integral PI controller being configured for:
receiving the determined difference reactive current and generating an adjusted reactive current compensation value as a function of the received difference reactive current;
receiving the determined difference reactive current from the control system; and
generating an adjusted reactive current compensation value responsive to the received determined difference reactive current;
each automatic voltage regulator (AVR) being configured for:
receiving a reference voltage from a reference voltage source;
receiving current compensation from the associated parallel cross-current compensation element CCC;
receiving the determined adjusted reactive current compensation value from the control system; and
generating an adjusted generator control input responsive to the received adjusted reactive current compensation value, the received reference voltage, and the received current compensation;
wherein the associated generator is a controlled generator configured for:
receiving the adjusted generator control input from the AVR associated with the controlled generator; and
adjusting an operation of the controlled generator in response to the received adjusted generator control input.

27. The system of claim 26 wherein the AVR associated with the controlled generator is further configured for generating as the adjusted generator control input an adjustment to the generator field voltage provided to the generator field control input of the controlled generator.

28. The system of claim 26 wherein the PI controller is a proportional integral derivative (PID) controller.

29. The system of claim 26 wherein each control system is further configured for generating the adjusted reactive current compensation value as an adjusted generator field voltage value, wherein the generated adjusted generator field voltage is provided to a voltage summing input of the AVR of each associated generator along with the received reference voltage and the received current compensation.

30. The system of claim 26 wherein each control system is further configured for each associated generator:
receiving first and second gains $K_I$, $K_G$ as input settings to the proportional- integral PI controller; and
wherein the generating of the adjusted reactive current compensation value is responsive to the received first and second gains $K_I$, $K_G$ input settings.

31. The system of claim 26 wherein each proportional-integral PI controller is further configured as a component of the parallel cross-current compensation element.

* * * * *